US010928847B2

(12) United States Patent
Suresh et al.

(10) Patent No.: US 10,928,847 B2
(45) Date of Patent: Feb. 23, 2021

(54) APPARATUSES AND METHODS FOR FREQUENCY SCALING A MESSAGE SCHEDULER DATA PATH OF A HASHING ACCELERATOR

(71) Applicant: Intel Corporation, Santa Clara, CA (US)

(72) Inventors: Vikram Suresh, Portland, OR (US); Sanu Mathew, Portland, OR (US); Sudhir Satpathy, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 114 days.

(21) Appl. No.: 16/147,652

(22) Filed: Sep. 29, 2018

(65) Prior Publication Data

US 2020/0103930 A1   Apr. 2, 2020

(51) Int. Cl.
  *G06F 9/02*   (2006.01)
  *G06F 1/06*   (2006.01)
(52) U.S. Cl.
  CPC ..................... *G06F 1/06* (2013.01)
(58) Field of Classification Search
  None
  See application file for complete search history.

(56) References Cited

U.S. PATENT DOCUMENTS 6,665,297 B1 * 12/2003 Hariguchi .............. H04L 45/00
                                                                 370/392
8,924,741 B2   12/2014 Wolrich et al.
(Continued)

FOREIGN PATENT DOCUMENTS

WO   2010039167 A1   4/2010
WO   2012141677 A1   10/2012

OTHER PUBLICATIONS

At N., et al., "Compact Hardware Implementations of ChaGha, Blake, Threefish, and Skein on FPGA" Feb. 2014, IEEE Transactions on Circuits and Systems—I: Regular Papers, vol. 61, No. 2, 14 Pages.
(Continued)

*Primary Examiner* — Cheng Yuan Tseng
(74) *Attorney, Agent, or Firm* — Nicholson De Vos Webster & Elliott LLP

(57) ABSTRACT

Methods and apparatuses relating to a hashing accelerator having a frequency scaled message scheduler data path circuit are described. In one embodiment, a hardware accelerator includes a message digest data path circuit comprising a first message digest circuit to output a second state vector, at a first clock rate, based on a first state vector and an output from a first switch, and a second message digest circuit to output a third state vector, at the first clock rate, based on the second state vector and an output from a second switch; a message scheduler data path circuit comprising at least one first message scheduler circuit to output an element into a second message vector, at a second clock rate that is slower than the first clock rate, based on a plurality of elements of a first message vector, and at least one second message scheduler circuit to output an element into a fourth message vector, at the second clock rate that is slower than the first clock rate, based on a plurality of elements of a third message vector; and a controller to switch the first switch at the second clock rate between sourcing a first element of the first message vector and a first element of the third message vector as the output from the first switch, and switch the second switch at the second clock rate between sourcing a second element of the first message vector and a second element of the third message vector as the output from the second switch.

24 Claims, 24 Drawing Sheets

(56) References Cited

U.S. PATENT DOCUMENTS

| | | | |
|---|---|---|---|
| 9,223,392 | B2 | 12/2015 | Sood |
| 9,912,479 | B1 | 3/2018 | Yamada |
| 2003/0059045 | A1* | 3/2003 | Ruehle .................. G06F 7/582 |
| | | | 380/46 |
| 2007/0283349 | A1 | 12/2007 | Creamer et al. |
| 2016/0352870 | A1 | 12/2016 | Manapragada et al. |
| 2017/0236123 | A1 | 8/2017 | Ali et al. |
| 2018/0006808 | A1 | 1/2018 | Suresh et al. |
| 2018/0205536 | A1 | 7/2018 | Tomlinson |
| 2018/0212761 | A1 | 7/2018 | Bilgin et al. |
| 2018/0352033 | A1 | 12/2018 | Pacella et al. |

OTHER PUBLICATIONS

European Search Report and Search Opinion Received for EP Application No. 19160418.0, dated Aug. 27, 2019, 7 pages.

Henzen L., et al., VLSI Characterization of the Cryptographic Hash Function BLAKE, IEEE Transactions on Very Large Scale Integration (VLSI) Systems, XP011371273, Oct. 31, 2011, vol. 19, No. 10, pp. 1746-1754.

Henzen L., et al., "VLSI Hardware Evaluation of the Stream Ciphers Salsa20 and ChaCha, and the Compression Function Rumba," 2nd International Conference on Signals, Circuits and Systems, XP031405857, Nov. 7, 2008, 5 pages.

Non-Final Office Action received for U.S. Appl. No. 15/884,259, dated Sep. 19, 2019, 9 pages.

Non-Final Office Action received for U.S. Appl. No. 15/943,654, dated Sep. 11, 2019, 13 pages.

Notice of Allowance, U.S. Appl. No. 15/943,654, dated Feb. 26, 2020, 9 pages.

Tillich S., et al., "Compact Hardware Implementations of the SHA-3 Candidates ARIRANG, BLAKE, Grostl, and Skein," International Association for Cryptologic Research, XP061003497, Jul. 14, 2009, vol. 20090718:044612, 6 pages.

Wikipedia, "ChaCha Variant" retrieved from https://en.wikipedia.orgiwiki/Salsa20, on Sep. 3, 2019, 3 Pages.

Bernstein D.J., et al., "ChaCha, a Variant of Salsa20," National Science Foundation, M/C 249, Jan. 28, 2008, 6 pages.

Brown, "SEC 1: Elliptic Curve Cryptography," Standards for Efficient Cryptography, Certicom Research, Version 2.0, May 21, 2009, 144 pages.

ConSensys, "Blockchain Underpinnings: Hashing," Medium, Jan. 13, 2016, downloaded from https://medium.com/@ConsenSys/blockchain-underpinnings-hashing-7f4746cbd66b on Jul. 25, 2017, 9 pages.

Extended European Search Report for Application No. 18178661.7, dated Nov. 14, 2018, 10 pages.

IBM Blockchain, "IBM Blockchain—Blockchain Solutions," Try IBM Blockchain on Bluemix, downloaded from https://www.ibm.com/blockchain/offerings.html on Jul. 26, 2017, 4 pages.

IBM corporation, "IBM z Systems: IBM z Systems is the Platform of Choice for Blockchain," IBM System group, 2016, downloaded from https://www-01.ibm.com/common/ssi/cgi-bin/ssialias?subtype=PS&infotype=SA&htmlfid=ZSP04578USEN&attachment=ZSP04578USEN.PDF, 14 pages.

IBM z Systems, "IBM Blockchain on z Systems," Blockchain transactions on Z, downloaded from https://www-03.ibm.com/systems/z/solutions/blockchain-transactions/ on Jul. 26, 2017, 5 pages.

Intel® Architecture, "Instruction Set Extensions and Future Features Programming Reference," 319433-034, May 2018, 145 pages.

Intel, "Intel® 64 and IA-32 Architectures Software Developer Manuals," Oct. 12, 2016, Updated—May 18, 2018, 19 pages.

Jeni, "How Might We Use Blockchains Outside Cryptocurrencies?," May 21, 2015, downloaded from http://www.jenitennison.com/2015/05/21/blockchain.html on Jul. 25, 2017, 9 pages.

Panneerselvam S., et al., "Rinnegan: Efficient Resource Use in Heterogeneous Architectures," Parallel Architectures and Compilation, PACT'16, Sep. 2016, pp. 373-386.

RFC 7539: Nir Y., et al., "ChaCha20 and Poly1305 for IETF Protocols," Internet Research Task Force (IRTF), Request for Comments: 7539, May 2015, 46 pages.

RFC 7693: Saarinen M.J., et al., "The BLAKE2 Cryptographic Hash and Message Authentication Code (MAC)," Independent Submission, Request for Comments: 7693, Nov. 2015, 31 pages.

Schutzer D., "CTO Corner: What is a Blockchain and why is it important?," BITS, Financial Services Roundtable, Jan. 14, 2016, downloaded from http://www.fsroundtable.org/cto-corner-what-is-a-blockchain-and-why-is-it-important/ on Jul. 25, 2017, 12 pages.

Sean, "If You Understand Hash Functions, You'll Understand Blockchains," Nov. 29, 2016, downloaded from https://decentralize.today/if-you-understand-hash-functions-youll-understand-blockchains-9088307b745d on Jul. 25, 2017, 5 pages.

Wikipedia, "Blockchain," downloaded from https://en.wikipedia.org/wiki/Blockchain on Jul. 25, 2017, 8 pages.

Wikipedia, "Encryption," downloaded from https://en.wikipedia.org/wiki/Encryption on Mar. 21, 2018, 4 pages.

Intention to Grant a Patent, EP App. No. 19160418.0, dated Sep. 9, 2020, 8 pages.

Wikipedia, ChaCha Variant (https://en.wikipedia.org/wiki/Salsa20) (Year: 2019).

Notice of Allowance, U.S. Appl. No. 15/884,259, dated May 6, 2020, 5 pages.

* cited by examiner

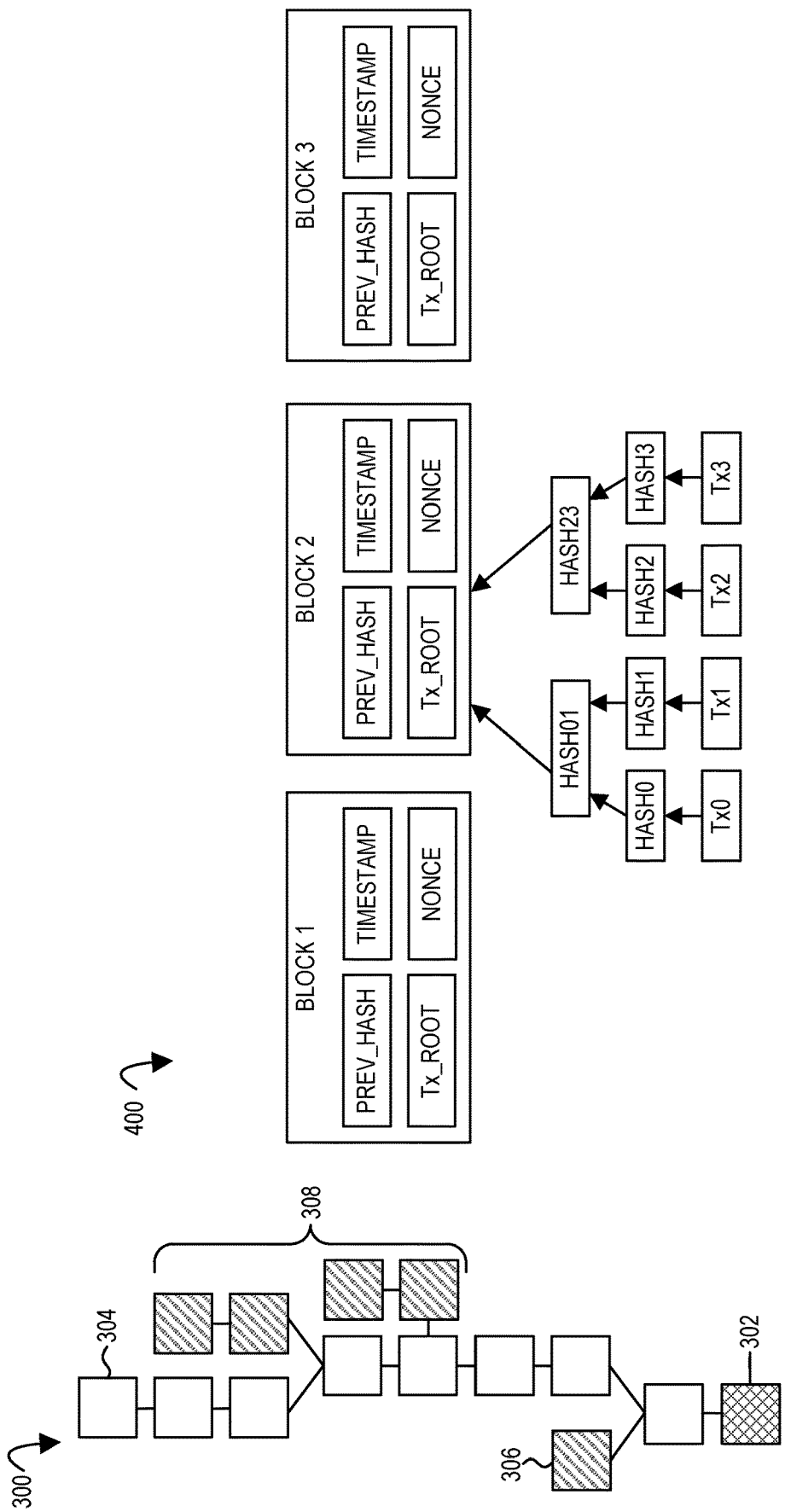

$\Sigma_0 \rightarrow$ SHA-256 : (ROTR(A,2) XOR ROTR(A,13) XOR ROTR(A,22))
$\Sigma_1 \rightarrow$ SHA-256 : (ROTR(E,6) XOR ROTR(E,11) XOR ROTR(E,25))
Maj $\rightarrow$ SHA-256/384/512 : ((A AND B) OR (B AND C) OR (C AND A))
Ch $\rightarrow$ SHA-256/384/512 : ((E AND F) OR ((NOT E) AND G))

$\sigma_0 \rightarrow$ SHA-256 : $(\text{ROTR}(W_i[1],7) \text{ XOR ROTR}(W_i[1],18) \text{ XOR SHR}(W_i[1],3))$
$\sigma_1 \rightarrow$ SHA-256 : $(\text{ROTR}(W_i[14],17) \text{ XOR ROTR}(W_i[14],19) \text{ XOR SHR}(W_i[14],10))$

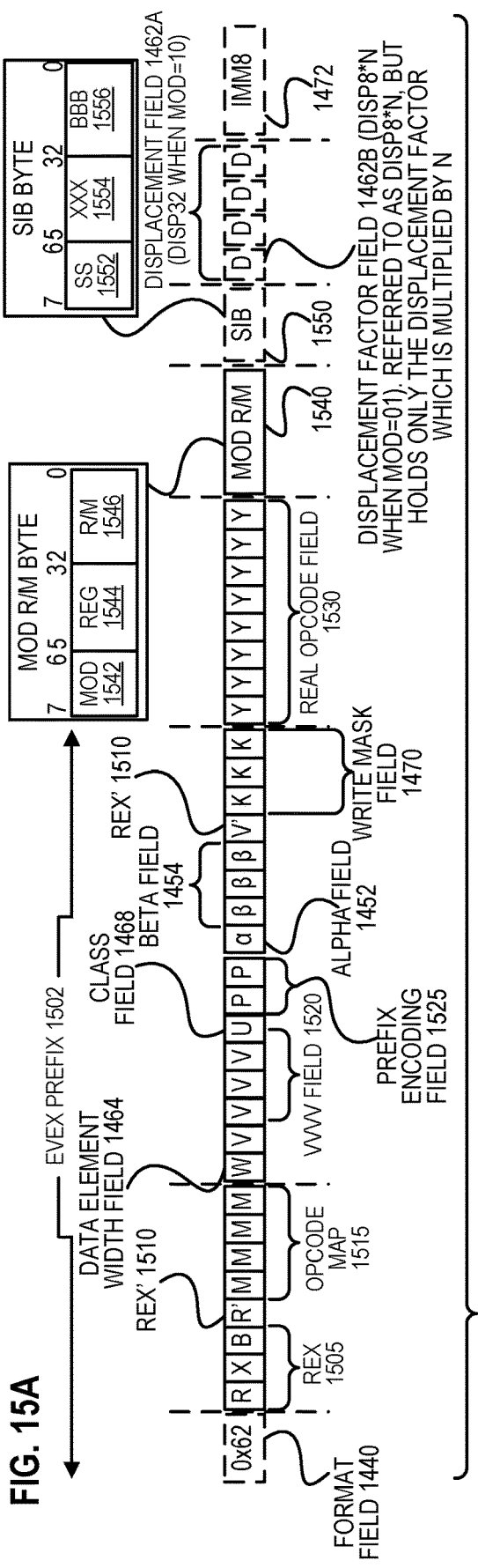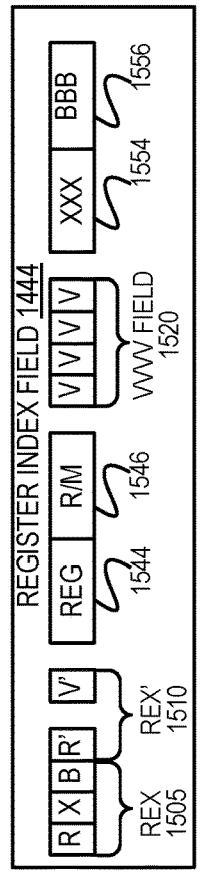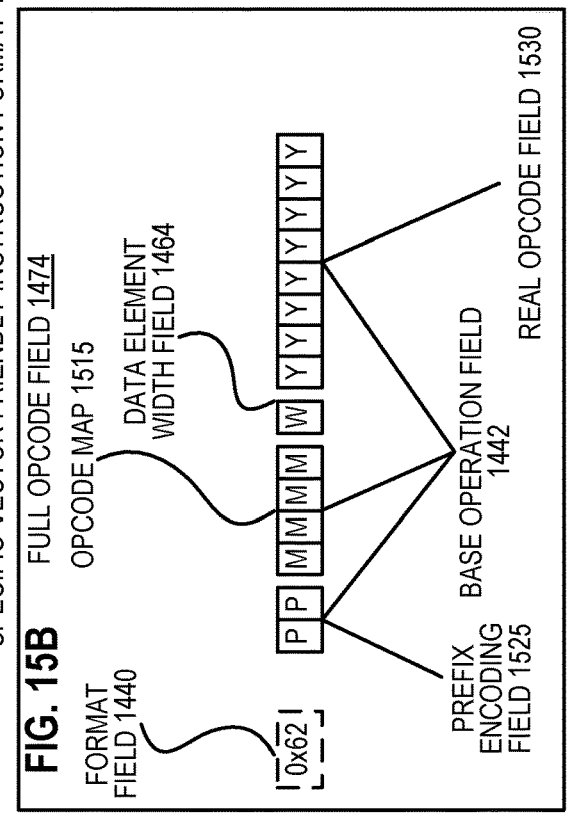

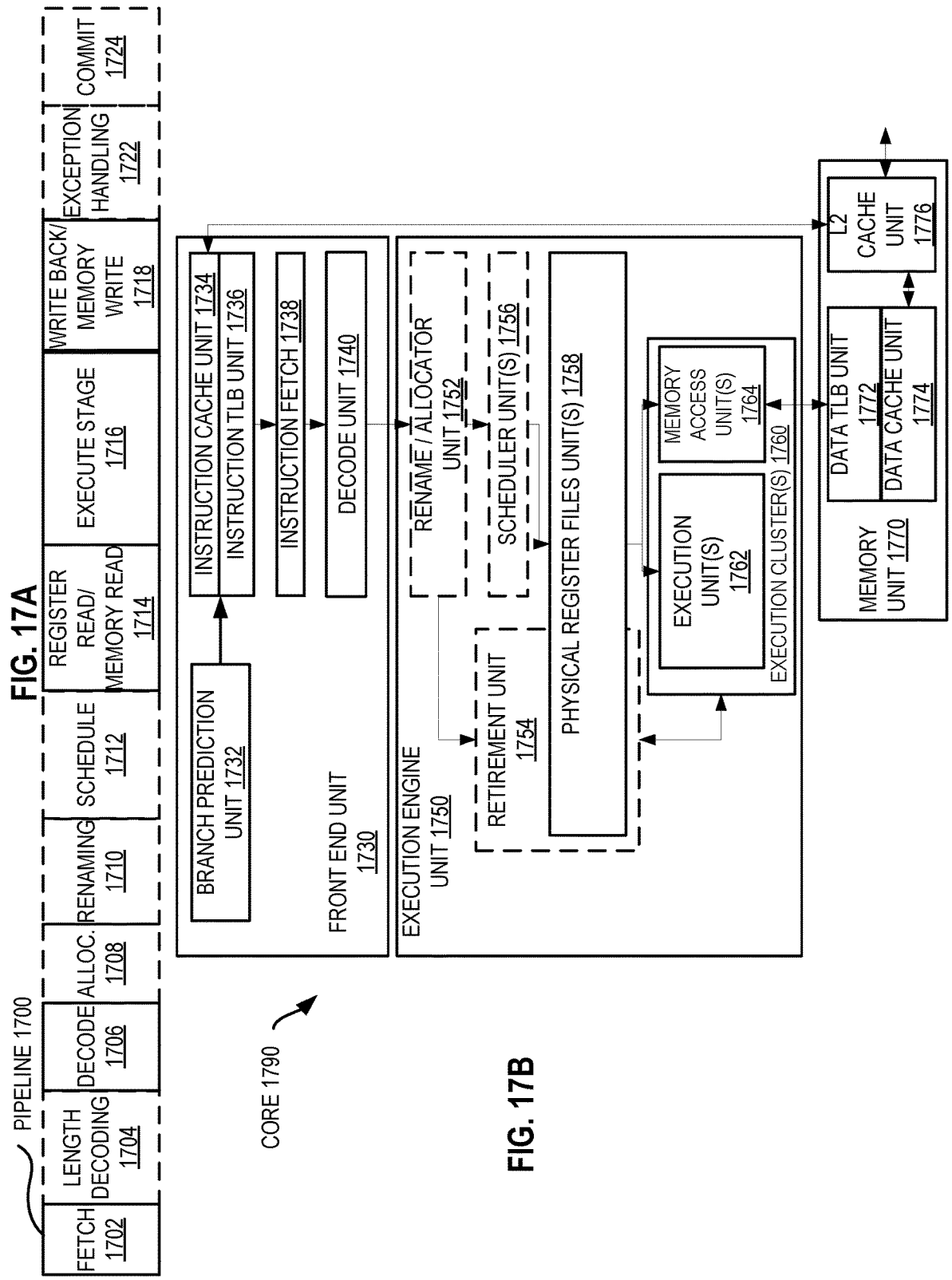

APPARATUSES AND METHODS FOR FREQUENCY SCALING A MESSAGE SCHEDULER DATA PATH OF A HASHING ACCELERATOR

TECHNICAL FIELD

The disclosure relates generally to electronics, and, more specifically, an embodiment of the disclosure relates to a hashing accelerator having a frequency scaled message scheduler data path circuit.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 3 illustrates an example blockchain according to embodiments of the disclosure.

FIG. 4 illustrates an example blockchain according to embodiments of the disclosure.

FIG. 15A is a block diagram illustrating fields for the generic vector friendly instruction formats in FIGS. 14A and 14B according to embodiments of the disclosure.

FIG. 15B is a block diagram illustrating the fields of the specific vector friendly instruction format in FIG. 15A that make up a full opcode field according to one embodiment of the disclosure.

FIG. 15C is a block diagram illustrating the fields of the specific vector friendly instruction format in FIG. 15A that make up a register index field according to one embodiment of the disclosure.

FIG. 17A is a block diagram illustrating both an exemplary in-order pipeline and an exemplary register renaming, out-of-order issue/execution pipeline according to embodiments of the disclosure.

FIG. 17B is a block diagram illustrating both an exemplary embodiment of an in-order architecture core and an exemplary register renaming, out-of-order issue/execution architecture core to be included in a processor according to embodiments of the disclosure.

DETAILED DESCRIPTION

Figure 1:
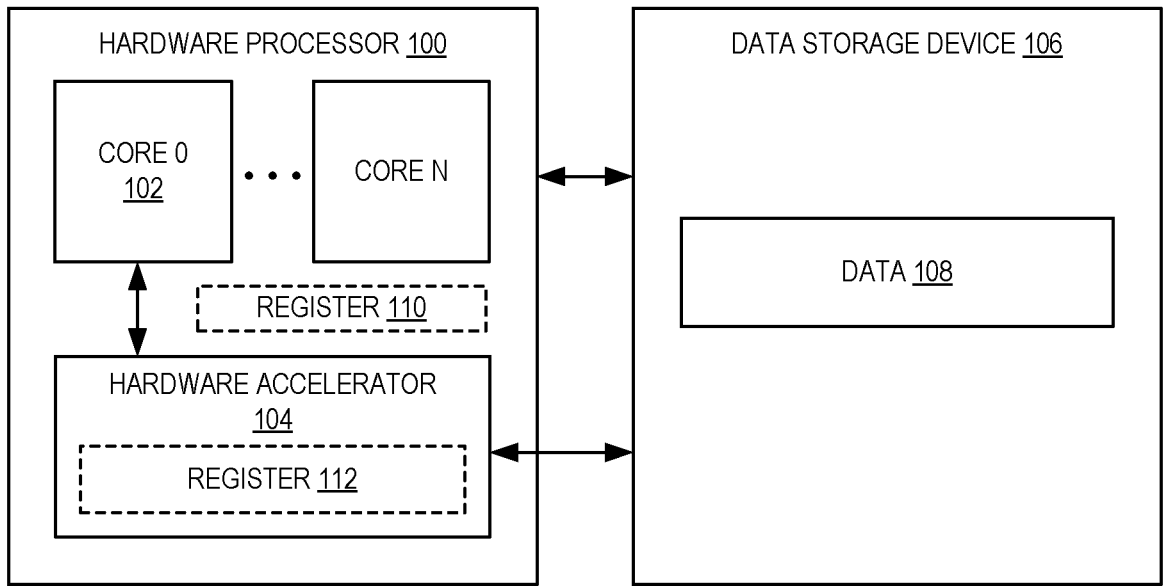
FIG. 1 illustrates a hardware processor with a hardware accelerator according to embodiments of the disclosure.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A (e.g., hardware) processor (e.g., having one or more cores) may execute instructions (e.g., a thread of instructions) to operate on data, for example, to perform arithmetic, logic, or other functions. For example, software may request an operation and a hardware processor (e.g., a core or cores thereof) may perform the operation in response to the request. In one embodiment, a processor is coupled to an (e.g., on die or off die) accelerator (e.g., an offload engine) to perform one or more (e.g., offloaded) operations, for example, instead of those operations being performed only on the processor. In one embodiment, a processor includes an (e.g., on die or off die) accelerator (e.g., an offload engine) to perform one or more operations, for example, instead of those operations being performed only on the processor. Two non-limiting examples of operations are a vector multiplication operation and a matrix multiplication operation. In one embodiment, an accelerator performs an operation in response to a request for a processor (e.g., a central processing unit (CPU)) to perform that operation. An accelerator may be a hardware accelerator (e.g., accelerator circuit). An accelerator may couple to a data storage device (e.g., on die with an accelerator or off die) to store data, e.g., the input data and/or the output data. In one embodiment, an accelerator couples to an input data storage device (e.g., input buffer) to load input therefrom. In one embodiment, an accelerator couples to an output data storage device (e.g., output buffer) to store output thereon. A processor may execute an instruction to offload an operation or operations (e.g., an instruction, a thread of instructions, or other work) to an accelerator. A non-limiting example of an operation is a hashing operation (e.g., a performing a round of hashing or a stage of hashing). Certain embodiments herein allow for the acceleration (e.g., via acceleration hardware) of one or more hashing operations (e.g., including accelerating operations according to a secure hash algorithm (SHA) standard) to significantly improve the performance of the hashing operations. As one example, an accelerator performs one or more hashing operations for blockchain mining.

FIG. 1 illustrates a hardware processor 100 including a plurality of cores (0 to N, where N may be 1 or more) and a hardware accelerator 104 according to embodiments of the disclosure. Depicted hardware processor 100 (e.g., accelerator 104 and/or core(s) thereof) are coupled to a data storage device 106 (e.g., memory). In one embodiment, memory is dynamic random access memory (DRAM), private (e.g., private to an accelerator) random access memory (RAM), cache memory, or system memory. In one embodiment, a section of memory is private an accelerator. Although a single hardware accelerator 104 is depicted, a plurality of hardware accelerators (e.g., 0 to M) may be utilized. Although a plurality of cores are depicted, a single core may be utilized, e.g., core 0 (102). A hardware accelerator may be a blockchain mining circuit.

A processor 100 (e.g., core 102) may receive a request (e.g., from software) to perform a hashing operation and may offload (e.g., at least part of) the hashing operation (e.g., thread) to hardware accelerator 104. Cores, accelerator(s), and data storage device 106 may communicate (e.g., be coupled) with each other. Arrows indicate two way communication (e.g., to and from a component), but one way communication may be used. In one embodiment, a (e.g., each) core may communicate (e.g., be coupled) with the data storage device 106, e.g., to access data 108. In one embodiment, an (e.g., each) accelerator may communicate (e.g., be coupled) with the data storage device 106, e.g., to access data 108. Data 108 may be hashing data (e.g., as discussed in reference to FIGS. 6-11). In the depicted embodiment, hardware accelerator 104 is within hardware processor 100. Hardware accelerator 104 may include any of the circuitry discussed herein. Hardware processor 100 may include one or more registers (e.g., register 110 separate from hardware accelerator 104). Register 110 may store hashing data (e.g., as discussed in reference to FIGS. 6-11). Hardware accelerator 104 may include one or more registers (e.g., register 112 separate from core(s)). Register 112 may store hashing data (e.g., as discussed in reference to FIGS. 6-11). Register 112 of hardware accelerator 104 may be loaded with the hashing data (e.g., by a core or cores of hardware processor 100), for example, prior to the hardware accelerator 104 performing the hashing operation.

Figure 2:
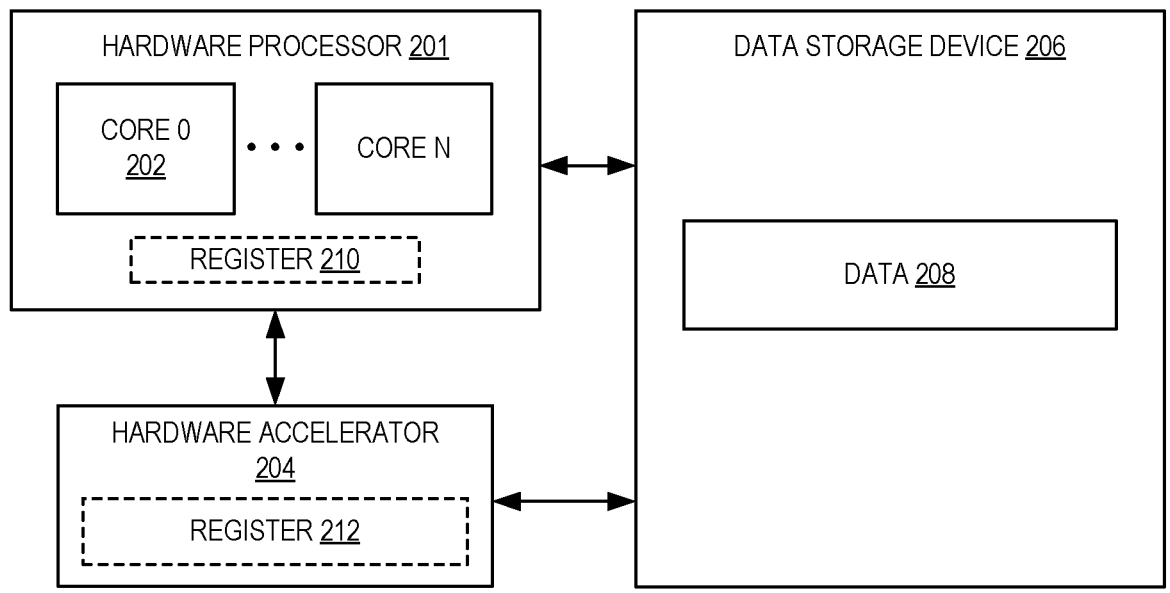
FIG. 2 illustrates a hardware processor and a hardware accelerator according to embodiments of the disclosure.

FIG. 2 illustrates a system 200 including a hardware processor 201 and a hardware accelerator 204 according to embodiments of the disclosure. In one embodiment, hardware accelerator 204 is on die with hardware processor 201. In one embodiment, hardware accelerator 204 is off die of hardware processor 201. In one embodiment, system 200 including at least hardware processor 201 and hardware accelerator 204 are a system-on-a-chip (SOC). Hardware processor 201 (e.g., core 202) may receive a request (e.g., from software) to perform a (e.g., hashing) thread (e.g., operation) and may offload (e.g., at least part of) the thread (e.g., operation) to a hardware accelerator (e.g., hardware accelerator 204). Hardware processor 201 may include one or more cores (0 to N). In one embodiment, each core may communicate with (e.g., be coupled to) hardware accelerator 204. In one embodiment, each core may communicate with (e.g., be coupled to) one of multiple hardware accelerators. Core(s), accelerator(s), and data storage device 206 may communicate (e.g., be coupled) with each other. Arrows indicate two way communication (e.g., to and from a component), but one way communication may be used. In one embodiment, a (e.g., each) core may communicate (e.g., be coupled) with the data storage device 206, for example, to access (e.g., load and/or store) data 208. In one embodiment, an (e.g., each) accelerator 204 may communicate (e.g., be coupled) with the data storage device 206, for example, to access (e.g., load and/or store) data 208. Data 208 may be hashing data (e.g., as discussed in reference to FIGS. 6-11). Hardware accelerator 204 may include any of the circuitry discussed herein. Hardware processor 201 may include one or more registers (e.g., register 210). Register 210 may store hashing data (e.g., as discussed in reference to FIGS. 6-11). Hardware accelerator 204 may include one or more registers (e.g., register 212). Register 212 may store hashing data (e.g., as discussed in reference to FIGS. 6-11). Register 212 of hardware accelerator 204 may be loaded with the hashing data (e.g., by hardware processor 201), for example, prior to the hardware accelerator 204 performing the hashing operation. Hardware accelerators may be provided for a particular hashing standard or standards. In some embodiments, a blockchain is implemented by utilizing hashing operations.

A blockchain at a high level may be viewed as a chain of blocks, for example, where each block contains a reference to the previous block(s) in the chain and may include some additional information, e.g., as discussed further below. A blockchain may generally be a distributed database that is used to maintain a continuously growing list of records, called blocks. Each block contains a timestamp and a link to a previous block in one embodiment. A blockchain (e.g., blockchain data structure) may be managed by a peer-to-peer network collectively adhering to a protocol for validating new blocks. By design, blockchains are inherently resistant to modification of the data. Once recorded, in certain embodiments, the data in any given block cannot be altered retroactively without the alteration of all subsequent blocks and a collusion of the network majority. Functionally, a blockchain may serve as an open, distributed ledger that can record transactions between two parties efficiently and in a verifiable and permanent way. The ledger itself can also be programmed to trigger transactions, e.g., automatically. Blockchains may be utilized for the recording of events, medical records, and other records management activities, such as, but not limited to, identity management, transaction processing (e.g., financial transactions), and documenting provenance. In one embodiment, a financial transaction is transferring something (e.g., a Bitcoin) from a first party to a second party.

Turning now to the Figures, FIG. 3 illustrates an example blockchain 300 according to embodiments of the disclosure. Each block may include one or more records, e.g., transactions. Each block may include batches of valid transactions that are hashed and encoded. Each block may include the hash of the prior block in the blockchain, e.g., linking the two blocks. The main chain (eight unshaded boxes) in depicted blockchain 300 is the longest series of blocks from the genesis block 302 to the current block 304. Orphan blocks (306 and 308) exist outside of the main chain in blockchain 300.

FIG. 4 illustrates an example blockchain 400 according to embodiments of the disclosure. Each block in the blockchain 400 includes a reference to the previous block in the chain (e.g., Prev_Hash in FIG. 4) and some additional information which makes up the content of the block. The link to the previous block is what makes it a chain, e.g., given a block you can find all the information in all the previous blocks that led to this one, right back to what is called the genesis block (the very first one in the chain). A blockchain may be managed (e.g. and stored) by a network of distributed nodes. Every node may have a copy of the entire blockchain. New nodes may come and go, e.g., synchronizing their copies of the blockchain against those of other nodes as they join the network. Multiple copies of the blockchain on a distributed network of nodes may be one of the powerful features of the blockchain. It may make the blockchain robust against nodes disappearing either temporarily or permanently, e.g., whether that is due to connectivity issues, hardware failures, or interference. The more nodes there are in the network, the harder it may be to disrupt the storage of the blockchain, e.g., there is no single point of failure, unlike in a centralized system with a single authority.

In the embodiment in FIG. 4, each block includes a header and a list of transactions (Tx0, Tx1 . . . Tx3). The header may include one or more of: a pointer to the previous block (e.g., Prev_Hash field in FIG. 4), a summary of the transactions the block contains (for example, a hash (e.g., Merkle tree hash) of those transactions (e.g., the Tx_Root field in FIG. 4), a timestamp that indicates when the block was created (e.g., Timestamp field in FIG. 4), and a proof of the work that went into creating the block (for example, the nonce field in FIG. 4, e.g., the nonce value may be used as part of a consensus mechanism or for another purpose). The timestamp (e.g., from a timestamp server) may provide irrefutable evidence that the data in a block existed at a particular time. As one example, the actual timestamp given in a particular block may not necessarily be to-the-second accurate. In one embodiment, if a block is in the blockchain, what is guaranteed is: the block was added (e.g., at most two hours) before its timestamp, the block before this block in the chain existed at the time the block was created, this block was added to the chain before the next block in the chain existed, and the data in this block (e.g., the transactions) existed at the time the block was created. The hash of the header of the block, incorporating each of these pieces of information, may become the identifier for the block which is used by the next block in the chain.

A (e.g., every) node in the network may add blocks to the blockchain. A (e.g., every) node is sent the data that needs to go into the blocks (e.g., the transactions). A (e.g., every) node may package up that data into a block that links back to the last block in the blockchain that they have knowledge (e.g., are aware) of. A (e.g., every) node may then transmit that block to the rest of the network to assert this is the new blockchain. To ensure that the nodes in the network have a consistent, consensus view of what the blockchain holds in certain embodiments, all nodes operate under a set of protocol rules that determine what a valid block looks like. These rules may include ensuring that each transaction is a valid transaction. Examples include that it is consuming resources that exist and have not already been consumed, that (e.g., smart) contract validation rules are satisfied, that it has been signed by the creator of the transaction, or that the transaction creator owns or has permission to operate on the specified resources. Another example is that it is spending money that actually exists for financial transaction (e.g., by pointing to a previous matching transaction within the blockchain) and that it has been signed by the creator of the transaction. These rules may ensure integrity between transactions: e.g., that the same resource (e.g., money) is not being consumed (e.g., spent) twice (e.g., each output of a transaction only forming the input of one other transaction). Another test for a valid block is where its nonce comes in. In one embodiment, to be a valid block, the hash of the header of the block always has to start with a certain number of zeros, e.g., it has to be below a certain target number (e.g., between 0 and the target number rather than between zero and a maximum number that will fit in a given number of available storage bits (e.g., 32-bits)). A header may contain the hash of the previous block in the chain, the (e.g., Merkle) hash of the transactions in the block a timestamp, and a nonce value. So if a node include a plurality of transactions that are to be put together into a block to add to the chain, the node may know the hash of the previous block in the chain. The node may calculate the (e.g., Merkle) hash for the transactions to be put in the block and the current time. But what may not be known, and what is to be calculated, is what nonce will result in the header of the new block having a hash that starts with a plurality of zeros. In one embodiment, the hashing means that there is no realistic way a node can algorithmically compute what nonce is going to give the block this property. A valid block, e.g., whose hash begins with a plurality of zeros, may be proof that the node that created it did lots of work, hence the nonce is sometimes called a proof of work.

The number of zeros that a block's hash has to start with, or the target number that it has to be below, may determine the difficulty of creating a new block, and hence the average time that it will take. The smaller the target number, the more zeros a hash may have to start with, the lower the probability of hitting on such a hash, and the harder it is to create a new block. Certain embodiments herein allow for the determination of a nonce (e.g., for a header) that meets (e.g., is less than or below) the target number.

Figure 5:
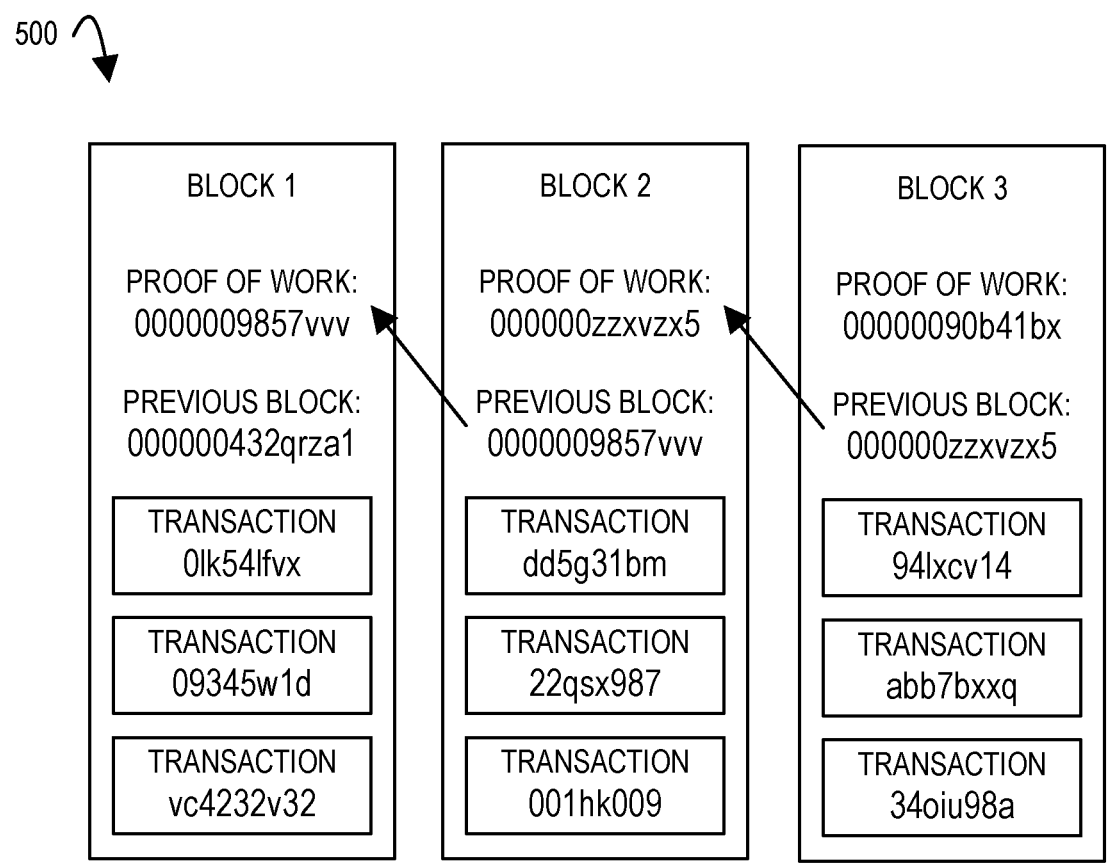
FIG. 5 illustrates an example blockchain according to embodiments of the disclosure.

FIG. 5 illustrates an example blockchain 500 according to embodiments of the disclosure. Each block in the blockchain 500 includes a reference to the previous block in the chain and some additional information which makes up the content of the block (e.g., proof of work and transactions). The numbers under each heading in FIG. 5 are merely examples. Transactions may be digitally-signed and chained into blocks, with each transaction cryptographically linked to all earlier ones by hashing paired data, the leaves, then pairing and hashing the results until a single hash remains (for example, the (e.g., Merkle) root hash or master hash). Every new transaction in a blockchain may carries with it an unforgeable record of the entire history of the currency and all previous transactions. This tight cryptographic coupling of all past transactions makes it difficult to assume multiple identities or to modify a transaction's details. At the same time, it may enable any party to verify the transaction details are authentic and has not been tampered. Hashes are one-way functions, so there is no easy way to find the right nonce or to engineer a block to be correct in certain embodiments, e.g., changing a block requires regenerating all successors and redoing the work they contain.

A hash function may take any input (e.g., state and message) and produce an output of a specific (e.g., fixed) size. The process of applying a hash function to some data, is generally called hashing. The output of a hash function is generally called a hash. The basic feature of a particular hash function is the (e.g., fixed) size of the output it produces. One characteristic of a secure cryptographic hash function is that it is one-way. This means that from the output, it is virtually impossible, or mathematically and computationally improbable, to determine what the input is. That is, given a hash, it should be infeasible to learn about or find the input data that was provided to the hash function. A term for this is pre-image resistance. In one embodiment, secure hash functions produce drastically different outputs, e.g., even if inputs differ by only a single bit. Cryptographic hash functions may also be collision resistant. A collision is when a hash function produces the same output, for more than one input. If hashing data item one and hashing different, data item 2 produce the same output, then a collision has occurred. Hashing may be extensively used with blockchains. Addresses on a blockchain may be derived by a process of hashing public keys, e.g., a Bitcoin address may be currently computed by hashing a public key with SHA2-256 and/or RIPEMD160. Collision resistance of the hash functions may be important because if two users generate the same address (a collision) then either could have access (e.g., spend the money sent) to that address. Signatures may also be a fundamental part of blockchains. Similar to signing a check, cryptographic signatures may determine which transactions are valid. Signatures may be generated from a hash of data to be signed, and a private key. Transaction hashes are highly visible in certain blockchains, e.g., transactions are referred to by their hash. For example, 5c504ed432cb51138bcf09aa5e8a410dd4a1e204ef84bfed1be16dfba1b22060 may be a transaction in a blockchain. Transaction hashes are also more direct to use, as compared to a description like the "1024th transaction in block 1337". Blocks in a blockchain may be identified by their hash, which serves the dual purpose of identification as well as integrity verification. An identification string that also provides its own integrity may be called a self-certifying identifier. For blockchains that use mining, the proof-of-work may be a number, generally called a nonce, that when combined with other data and hashed, produces a value smaller than a specified target, e.g., one of over 10 septillion hashes. When a valid nonce is found, verifying it may be done within a second, and then the new block propagates across the network, forming the latest consensus and blockchain. Certain embodiments herein allow for the determination of a nonce (e.g., for a header) that meets (e.g., is less than or below) the target number.

Since storage in blockchains may be considered permanent, and storing large amounts of data on a blockchain is not economical, the practical way to store data on a blockchain may be to store a fixed (e.g., and normally smaller) size representation of the data called the "hash of the data." Another use for a blockchain is as a timestamping service. One may store data in the blockchain now, and anytime later, they may show it on the blockchain to prove it existed previously. In certain blockchains, the data itself is hashed and store the hash on the blockchain instead. When data is to be proved to be of that age, one may provide the data, then one may hash the picture and compare it against the hash that was stored on the blockchain. There are also more advanced examples where hashing is involved, for example in Merkle trees which are at the root of current innovation for blockchains and scalability.

Currently, Bitcoin is the most popular digital currency used for peer-to-peer transactions, e.g., eliminating the need for intermediate financial institutions by guaranteeing authenticity and user anonymity using digital signatures. It purports to solve the critical issue of double spending of a single instance of currency using the concept of block chaining, where a public ledger captures all the transactions that occur in the digital currency system. In certain embodiments, every block added to the chain validates a new set of transactions by compressing the Merkel root of the transactions along with information of the time stamp, version, target, and the hash of the previous block. The process of validating transactions and computing new blocks of the chain may generally be referred to as mining. In certain embodiments, the most time and/or energy (e.g., power) consuming operation in mining involves the computationally intensive task of finding a (e.g., 32-bit) nonce, which when appended to the Merkel root, previous hash, and other data of a header, produces a (e.g., 256-bit) hash value which is less than a pre-defined threshold value (the target). In certain embodiments, this hashing operation is the largest recurring cost a miner incurs in the process of creating a (e.g., Bitcoin) block and therefore there is a strong motivation to reduce the energy consumption of this process. Certain embodiments herein utilize a hashing accelerator to perform a hashing operation, e.g., with a blockchain mining circuit of the hashing accelerator. The below includes a discussion according to implementing a SHA hash, but it should be understood that the following hardware and methods may utilize other hashing standard or standards.

Figure 6:
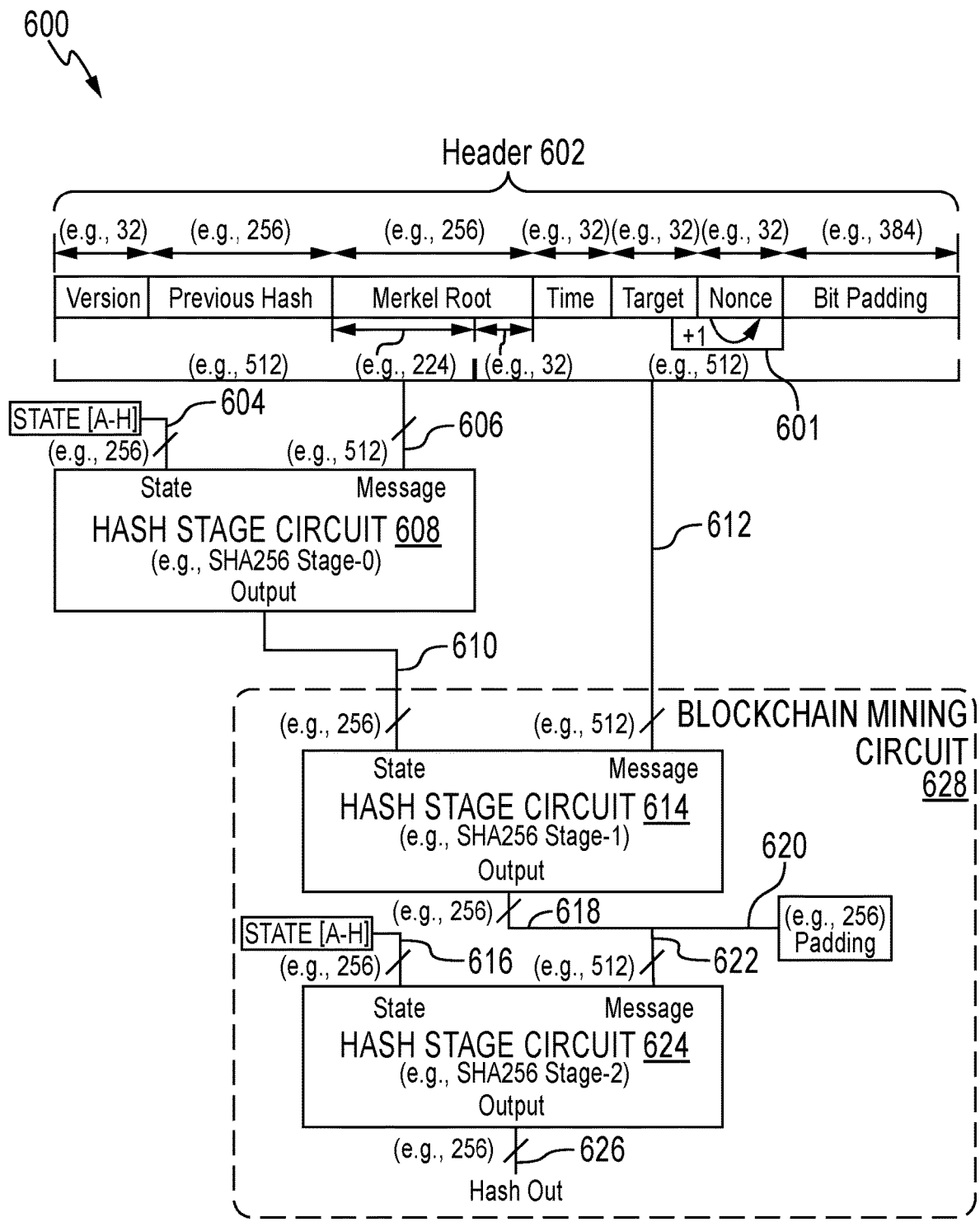
FIG. 6 illustrates a hashing accelerator that includes a plurality of hash stage circuits according to embodiments of the disclosure.

FIG. 6 illustrates a hashing accelerator 600 that includes a plurality of hash stage circuits (608, 614, 624) according to embodiments of the disclosure. In the depicted embodiment, hashing accelerator receives a (e.g., 1024-bit message) header 602, performs three stages of (e.g., SHA-256, SHA-384, or SHA-512) hashing with hash stage circuits (608, 614, 624), respectively, and outputs a (e.g., 256-bit) hash value 626 (e.g., a digest), for example, for a bitcoin mining operation. In SHA-256 hash, the hash value includes eight states (A-H) which may be stored in a register (e.g., eight state registers) associated with each hash stage circuit (608, 614, 624). In one embodiment, each state is a 32-bit word (represented by A, B, C, D, E, F, G, H). The initial values of these states are 32-bit constants in certain embodiments. Alternatively, the state may be a hash value calculated from a previous iteration or stage of the hashing process. In certain embodiments, the states (A, B, C, D, E, F, G, H) are updated during SHA-256 hash calculation to generate a 256-bit hash value as the output for each of hash stage circuits (608, 614, 624). In one embodiment, the SHA-256 hash consumes a block of a (e.g., 512-bit) message (e.g., message vector) and compresses it into a 256-bit hash (A-H) (e.g., state value). In certain embodiments, a Bitcoin mining process employs three stages (0-2) of a SHA-256 hash to convert the 1024-bit input header 602 to a 256-bit hash value output 626 that is compared to a target value of header 602 to determine whether a Bitcoin has been identified.

In one embodiment, each hash stage circuits (608, 614, 624) performs 64 rounds (identified as round 0 to round 63) of applications of hashing to the state (A-H) based on a (e.g., 512-bit) message value. Table 1 below illustrates pseudocode for 64 rounds of SHA-256 operations as applied to the states A-H to generate a hash value output (e.g., state vector). The final hash output 626 (e.g., state value) from hash stage circuit 624 is used to determine if a valid nonce is found as a proof of the identification of certain embodiments (e.g., for Bitcoin).

TABLE 1

• Apply the SHA-256 compression function to update state vector A-H
For i = 0 to 63
{
    Compute Ch(E, F, G), Maj(E, F, G), $\Sigma_0(A)$, $\Sigma_1(E)$, and $W_i$ (see Figures 8A-9B)
    $T_1 = H + \Sigma_1(E) + Ch(E, F, G) + K_j + W_j$
    $T_2 = \Sigma_0(a) + Maj(A, B, C)$
    H ← G
    G ← F
    F ← E
    E ← D + $T_1$
    D ← C
    C ← B
    B ← A
    A ← $T_1 + T_2$
} where logic functions Ch(E, F, G), Maj(E, F, G), $\Sigma_0$, $\Sigma_1$ are compression functions that are defined according to the SHA-256 specification, and each state (e.g., state vector A-H) is initiated with a 32-bit initial values, and $W_i$, i=0 to 63, are (e.g., 32-bit) values derived from a (e.g., 512-bit) message which is part of the 1024-bit input header (e.g., a Bitcoin header).

As shown in FIG. 6, the three-stage hashing operation (e.g., Bitcoin mining) starts with an input of a 1024-bit header 602. The depicted header 602 (e.g., Bitcoin input) includes a respective field for the following values: (e.g., 32-bit) version number, (e.g., 256-bit) previous hash (e.g., generated by the immediately preceding block in the blockchain), (e.g., 256-bit) Merkel root of the transaction, (e.g., 32-bit) timestamp (time), (e.g., 32-bit) target (e.g., maximum target), (e.g., 32-bit) nonce, and (e.g., 384-bit) padding. In certain embodiments, the version number is an identifier associated with the version of the blockchain, the previous hash is the hashing result (A-H) from the immediate preceding block in the blockchain recorded in the public ledger, the Merkle root is the a 256-bit hash based on all of the transactions in the block, the timestamp represents the current time when the current blockchain (e.g., Bitcoin mining) process starts, the target value represents a threshold value that the resulting hash value (e.g., output at 626 for a blockchain (e.g., Bitcoin mining) is compared against, and/or the padding bits include 1s and 0s that are generated using a padding generation formula of the hashing standard (e.g., to extend the input message to a multiple of 512-bits).

In one embodiment, if the resulting hash value 626 ("hash out") is smaller than or equal to the target value in header 602, the nonce chosen in the header 602 is identified as a valid nonce that is to be used as the proof of the identification of the block (e.g., for a Bitcoin) and/or if the resulting hash value 626 ("hash out") is greater than the target value in header 602, the nonce chosen in the header 602 is identified as an invalid nonce (e.g., or the Bitcoin mining failed to find a valid Bitcoin). In certain embodiments, the value of nonce in header 602 (but none of the other values) is updated (e.g., incremented by one by incrementing circuit 601) from the invalid nonce, and the three-stage hashing operation (e.g., Bitcoin mining) starts again with the input of the same 1024-bit header 602 with the previous nonce updated to determine the validity of the updated nonce.

In one embodiment, the comparison of the resulting hash value 626 with the target value from the header 602 includes determining whether the hash value 626 has a minimum number of leading zeros to ensure that the hash value 626 is smaller than the target value from the header 602. The target value (or the number of leading zeros) may be changed to adjust the complexity of Bitcoin mining: decreasing the target value decreases the probability of finding a valid nonce and hence increases the overall search space to generate a new block in the blockchain. By modifying the target value of header 602, the complexity of the block generation (e.g., Bitcoin mining) is adjusted to ensure that the time used to find a valid nonce is relative constant (e.g., approximately 10 minutes). In one embodiment, for a given header, the hashing accelerator 600 sweeps through iterations of the search space of $2^{32}$ possibilities to find a valid nonce within that time limit, e.g., where all the header 602 values other than the nonce are kept the same the same through these iterations while only the nonce of header 602 is changed (e.g., incremented by one). The depicted hashing accelerator 600 includes three stages (stage-0, stage-1, and stage-2) of hash calculations, and thus three hash stage circuits (608, 614, 624), respectively, although one or any plurality of stages or circuits may be used.

In the depicted embodiment, hash stage circuit 608 is to perform the first stage (stage-0) of the hashing operation. In the depicted (e.g., SHA-256 hash) embodiment, the state vector (A, B, C, D, E, F, G, H) 604 (e.g., vector of constants) is loaded (e.g., initiated) with the (e.g., eight 32-bit) state constants and the message vector 606 is loaded (e.g., initiated) with the first 512-bit of the header 602, which includes the 32-bit version number, the 256-bit hash value from the last block in the blockchain, and a portion (e.g., the first 224 bits) of Merkle root of header 602. As discussed further herein, the hash stage circuit 608 performs the (e.g., 64) rounds of the first stage (stage-0) of the hashing operation and produces a 256-bit intermediate hash value 610.

In the depicted embodiment, hash stage circuit 614 is to perform the second stage (stage-1) of the hashing operation.

In the depicted (e.g., SHA-256 hash) embodiment, the state vector (A, B, C, D, E, F, G, H) 610 input is the (e.g., eight 32-bit) state vector output from hash stage circuit 608 and the message vector 612 is loaded (e.g., initiated) with the second 512-bit of the header 602, which includes the remaining portion (e.g., 32 bits) of the Merkle root, the 32-bit time stamp, the 32-bit target value, the 32-bit nonce, and the 384-bit of bit padding. As discussed further herein, the hash stage circuit 614 performs the (e.g., 64) rounds of the second stage (stage-1) of the hashing operation and produces a 256-bit intermediate hash value 618.

In the depicted embodiment, hash stage circuit 624 is to perform the third stage (stage-2) of the hashing operation. In the depicted (e.g., SHA-256 hash) embodiment, the state vector (A, B, C, D, E, F, G, H) 616 (e.g., vector of constants) is loaded (e.g., initiated) with the (e.g., eight 32-bit) state constants (e.g., having the identical value as the state vector 604 from stage-0) and the message vector 612 is the 256-bit intermediate hash value 618 output from stage-1 extended (e.g., concatenated) by 256-bit of padding 620 to form a 512-bit message vector. As discussed further herein, the hash stage circuit 624 performs the (e.g., 64) rounds of the third stage (stage-2) of the hashing operation and produces a 256-bit hash value 626 ("hash out").

In certain embodiments, hashing accelerator 600 is then to compare the hash value 626 ("hash out") to the target value in header 602. In one embodiment, if the hash value 626 ("hash out") is smaller than or equal to the target value in header 602, the nonce chosen in the header 602 is identified as a valid nonce that is to be used as the proof of the identification of the block (e.g., for a Bitcoin) (e.g., and an indicate of a valid nonce/block is generated by the hashing accelerator 600) and if the resulting hash value 626 ("hash out") is greater than the target value in header 602, the nonce chosen in the header 602 is identified as an invalid nonce (e.g., or the Bitcoin mining failed to find a valid Bitcoin). In certain embodiments, the value of nonce in header 602 (but none of the other values) is updated (e.g., incremented by one by incrementing circuit 601) from the invalid nonce, and the three-stage hashing operation (e.g., Bitcoin mining) starts again with the input of the same 1024-bit header 602 with the previous nonce updated to determine the validity of the updated nonce.

In one embodiment, if no valid nonce is found for a Merkel root, the Merkel root of a header is changed by choosing a different set of pending transactions and starting over with the nonce search. In one embodiment, the SHA256 Stage-0 is performed once per Merkel root and can be implemented either in a (e.g., one-time) hashing (hardware) accelerator or in software.

In one embodiment, hash stage circuit 614 for stage-1 and hash stage circuit 624 for stage-2 are combined into a single, blockchain mining circuit 628 as they are both related to the (e.g., incrementing) nonce of header 602. In one embodiment, an accelerator includes a plurality of instances of blockchain mining circuits. In an embodiment where stage-0 of the SHA-256 hash involves only part of the header information, but not the nonce itself, the calculation of stage-0 SHA-256 may be performed by another component separate from the hashing accelerator 600 (e.g. and intermediate hash value input at 610 reused by blockchain mining circuit 628).

Figure 7:
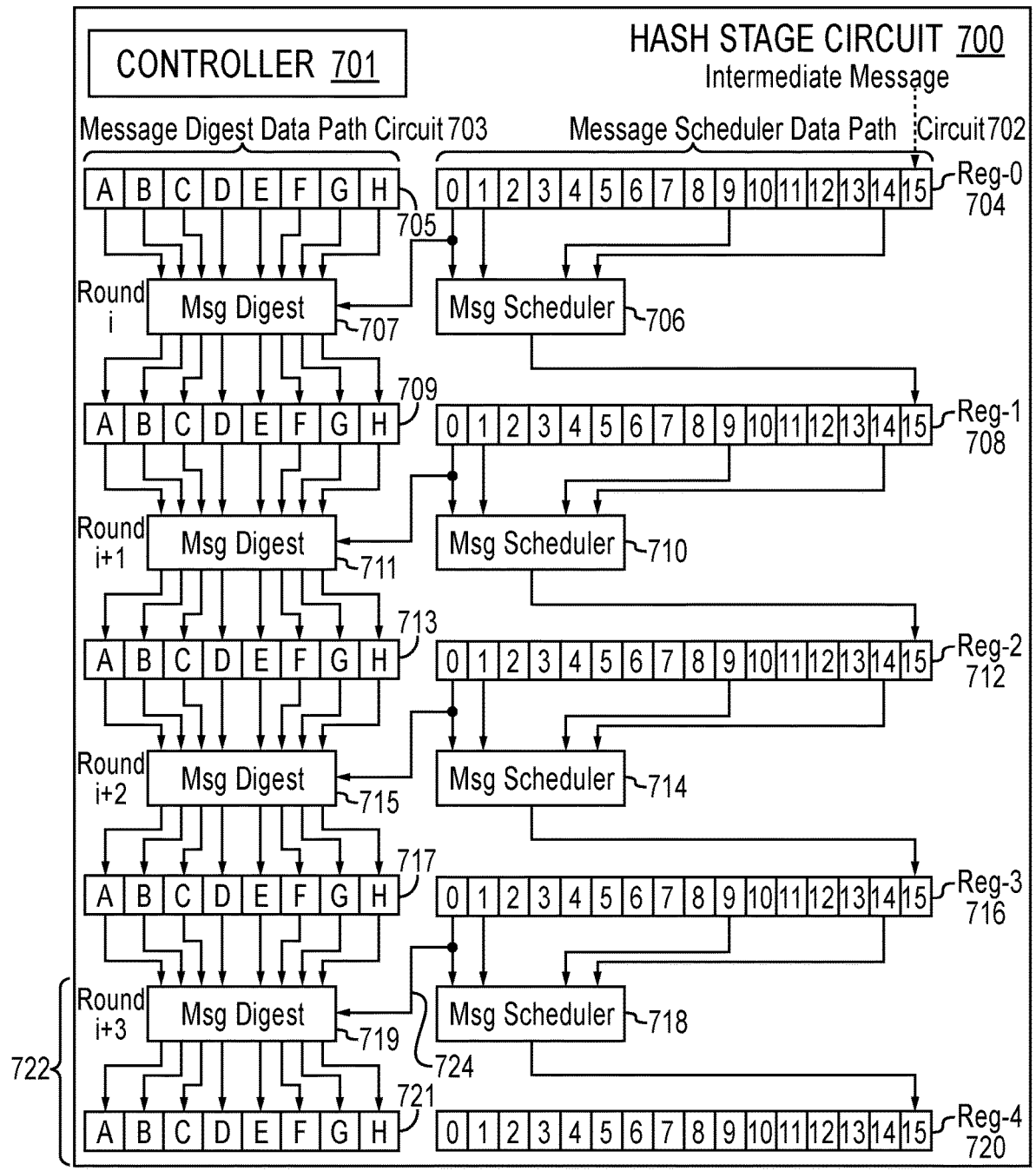
FIG. 7 illustrates a hash stage circuit that includes a message digest data path circuit and a message scheduler data path circuit according to embodiments of the disclosure.

FIG. 7 illustrates a hash stage circuit 700 that includes a message digest data path circuit 703 and a message scheduler data path circuit 702 according to embodiments of the disclosure. In one embodiment, each of (e.g., any of) hash stage circuits (608, 614, 624) in FIG. 6 are an instance of hash stage circuit 700, for example, where input register 705 receives the input state vector 604, 610, or 616, input register 704 receives the input message vector 606, 612, or 622, respectively, and the output of the respective hash stage circuits (608, 614, 624) is state (e.g., hash) output register 721. Depicted message digest data path circuit 703 includes a plurality of registers (705, 709, 713, 717, 721) to store state vectors of the hash stage circuit 700 (e.g., with the initial state being input into register 705 and the final state being output into register 721), and a plurality of message digest circuits (707, 711, 715, 719) to perform message digest operations on state vectors (e.g., as discussed in reference to FIGS. 8A-8B). Depicted message scheduler data path circuit 702 includes a plurality of registers (704, 708, 712, 716, 720) to store (e.g., intermediate) message vectors of the hash stage circuit 700 (e.g., with the initial message being input into register 704 and the final message being output into register 720), and a plurality of message scheduler circuits (706, 710, 714, 718) to perform message scheduler operations on (e.g., elements W[0], W[1], W[9] and W[14] of) message vectors (e.g., as discussed in reference to FIGS. 9A-9B).

Note that the output from each round of message scheduler circuits (706, 710, 714, 718) is sent to a respective message digest circuit (707, 711, 715, 719), e.g., element [0] from register 708 is an input to message digest circuit 711.

Although four rounds of circuitry are shown, it should be understood that any number of rounds may be included by connecting further instances of circuitry in the circuit 700, for example, further instances of block 722 (e.g., a set of: a message digest circuit 719 and its inputs and outputs (including the connection 724 from the output of previous message scheduler circuit 714 (e.g., via register 716) to message digest circuit 719), message scheduler circuit 718 and its inputs and outputs, and associated registers).

In one embodiment, a single hash stage circuit 700 includes a same number of rounds (e.g., 64 rounds) in each of message digest data path circuit 703 and a message scheduler data path circuit 702 to perform a single stage of that same number of rounds (e.g., one stage being 64 rounds). This may be referred to as a fully-unrolled, hash stage circuit 700, e.g., in comparison to looping multiple rounds for a single stage back through a same set of hardware. As one example, a single fully-unrolled hash stage circuit 700 includes 65 sets of register pairs (e.g., 705 and 704 being one pair) if including one register pair to receive input data and 64 sets of register pairs to cascade the rounds of the hash through the registers to produce the output (e.g., output from 610, 618, or 626 in FIG. 6).

In one embodiment, controller 701 (e.g., implementing a state machine according to this disclosure) is to control the rounds of operation. In one embodiment, a set of data is clocked into the registers on each (e.g., rising or falling edge of a) clock cycle (e.g., a clock of the hash stage circuit 700).

Figures 8A, 8B:
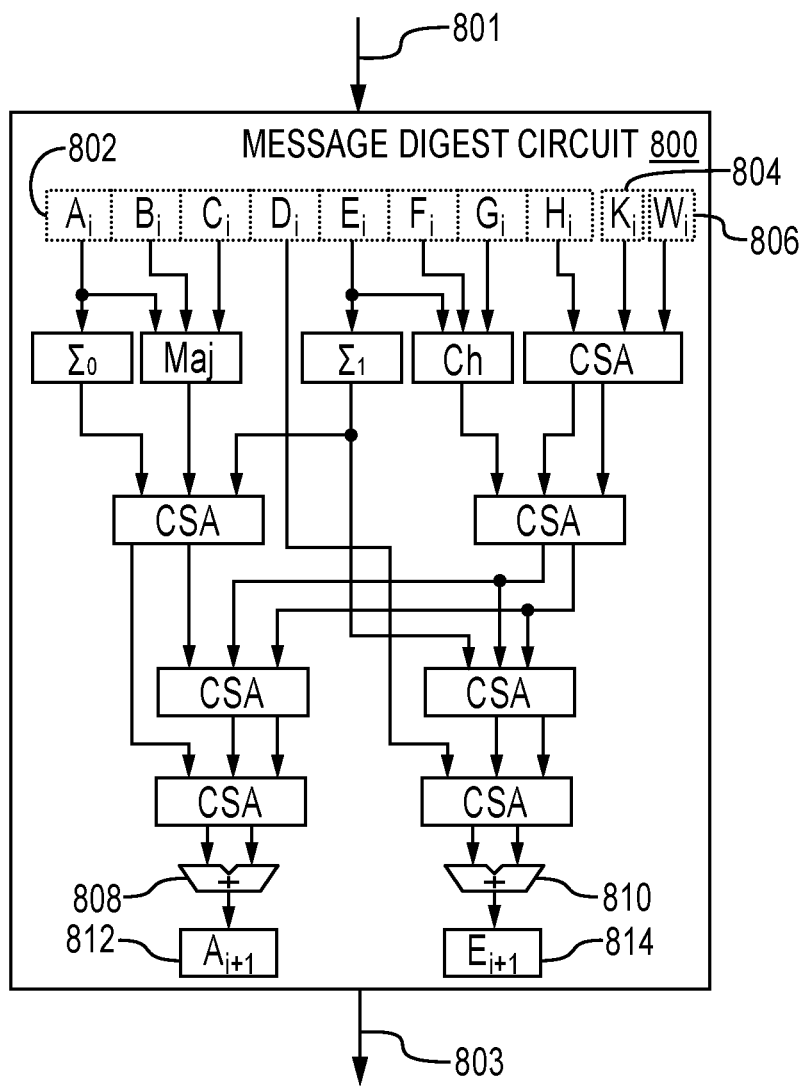
FIG. 8A illustrates a message digest circuit according to embodiments of the disclosure.
FIG. 8B illustrates an example logic design of the logic circuits in the message digest circuit in FIG. 8A according to embodiments of the disclosure.
Figure 10:
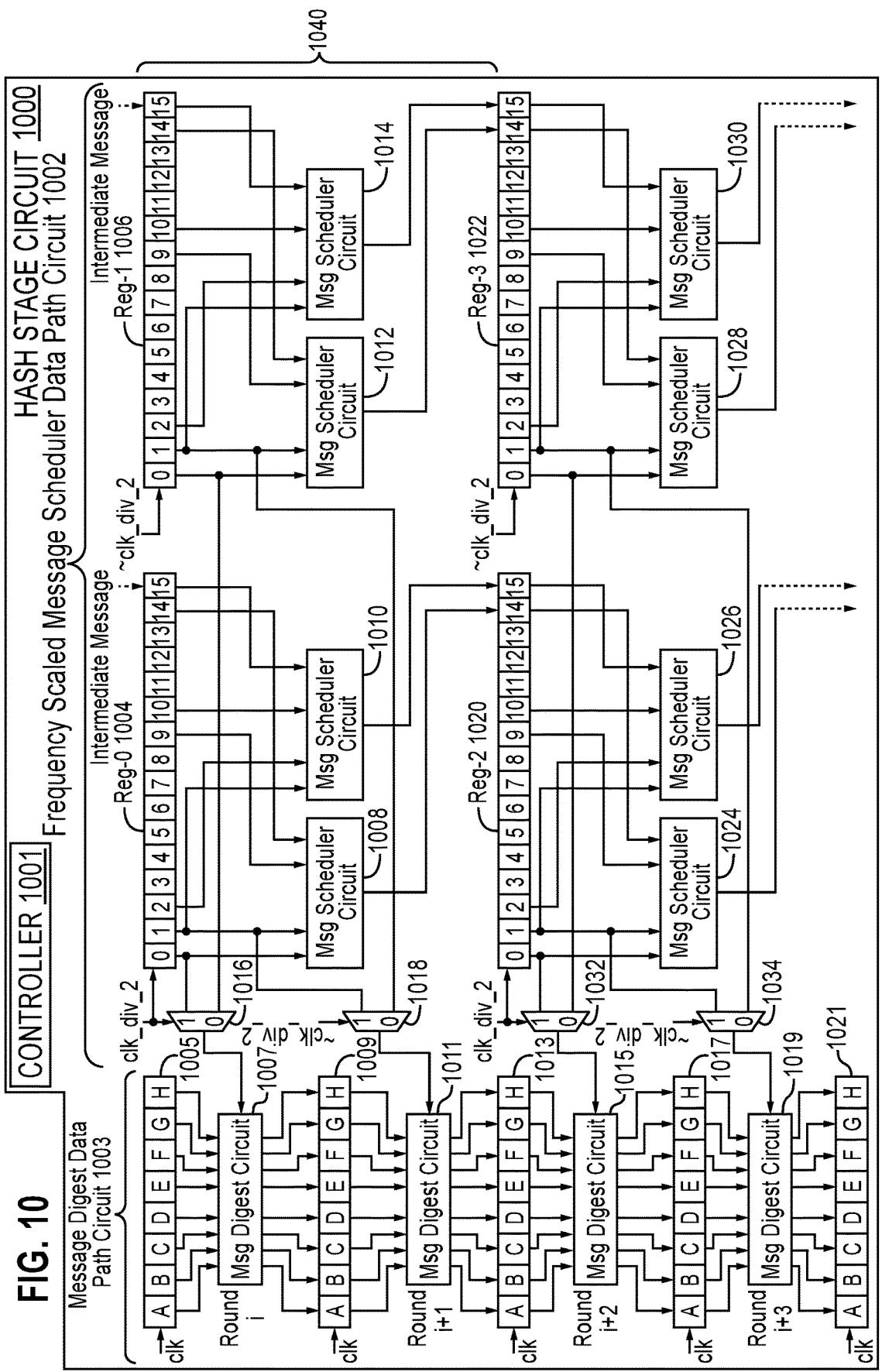
FIG. 10 illustrates a hash stage circuit that includes a message digest data path circuit and a frequency scaled message scheduler data path circuit according to embodiments of the disclosure.
Figure 11:
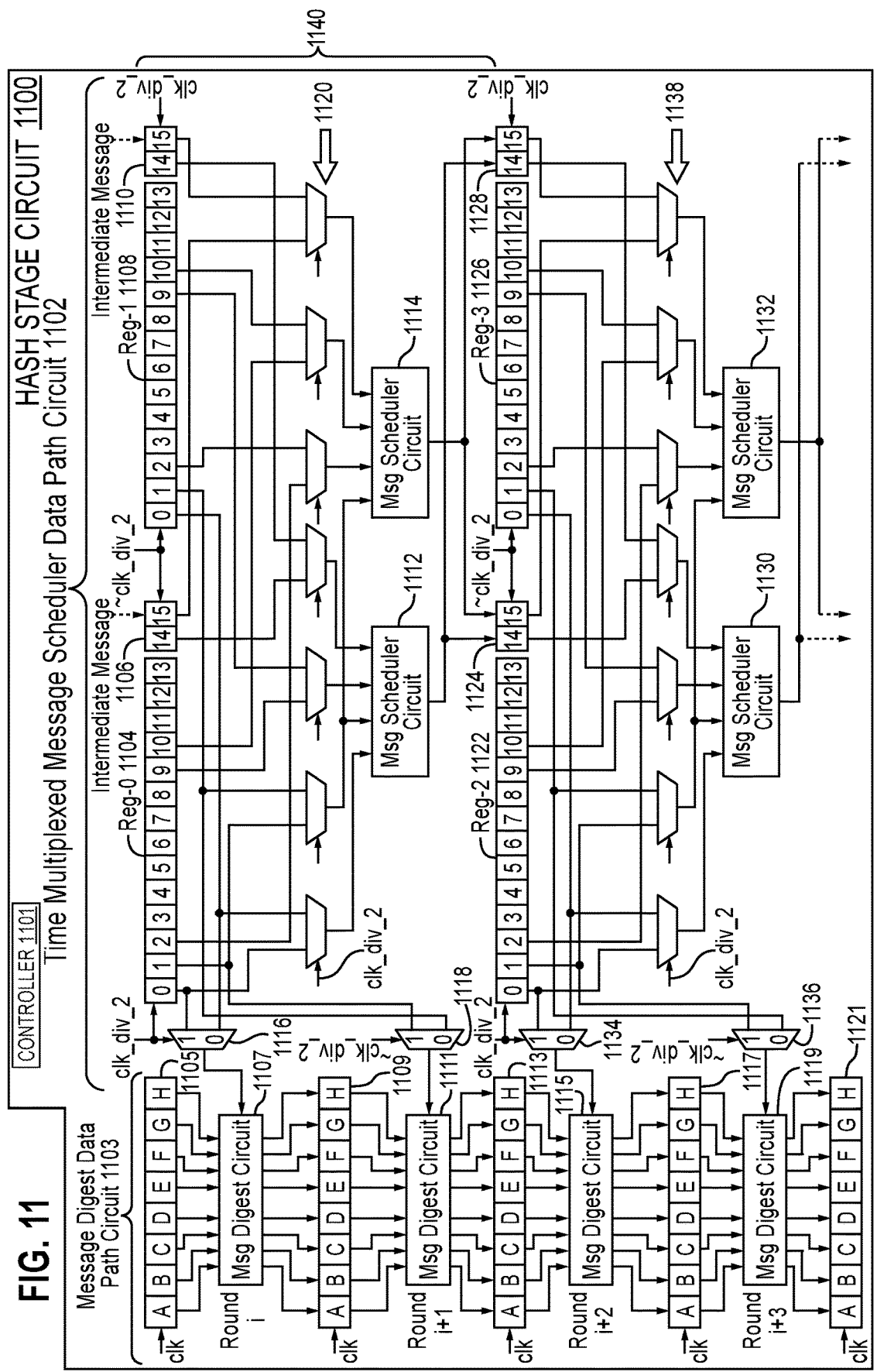
FIG. 11 illustrates a hash stage circuit that includes a message digest data path circuit and a time scaled message scheduler data path circuit according to embodiments of the disclosure.

FIG. 8A illustrates a message digest circuit 800 according to embodiments of the disclosure. In one embodiment, each message digest circuit in FIG. 7, 10, or 11 is an instance of message digest circuit 800. Depicted message digest circuit 800 includes an input 801 to receive a state vector (e.g., A-H) 802, a $K_i$ input 804, and a $W_i$ input 806 (where the i is the number of the previous round). In one embodiment, $W_i$ is the expanded message (e.g., 32-bits of the 512-bit working message) of round i and $K_i$ is the round constant of round i, e.g., according to a hashing standard. In the depicted embodiment, the CSA elements are carry-save adders. In one embodiment, an adder (e.g., adder 808 and/or adder 810) adds their respective addends modulo of some particular value (e.g. modulo $2^{32}$ or $2^{64}$) to produce their respective sums (e.g., output 812 and output 814, respectively).

FIG. 8B illustrates an example logic design of the logic circuits Ch(E, F, G), Maj(E, F, G), $\Sigma_0$(A), $\Sigma_1$(E) (for example, discussed in Table 1) in the message digest circuit 800 in FIG. 8A according to embodiments of the disclosure. ROTR (variable1, variable2) refers to a right rotate (e.g., with wrap around) of an input of (I) variable1 (e.g., element A of state vector for the current round (e.g., round 0 to 63) in input register 802) by (II) a number of bits equal to variable2). For example, ROTR(E,6) is to rotate element E from input register 802 by 6 bits to the right. XOR refers to a logical, bitwise exclusive OR (XOR) operation, for example, outputting a true (e.g., logical one) if an odd number of its multiple arguments are true, and false (e.g., logical zero) otherwise. AND refers to a logical, bitwise AND operation, for example, only outputting a true for a single bit if all of the inputs of that bit position are true. OR refers to a logical, bitwise OR operation, for example, outputting a true for a single bit if any of the inputs of that bit position are true. In one embodiment, the output 803 from message digest circuit 800 is a state vector (e.g., elements A-H for the next round i+1) that includes value $A_{i+1}$ from 812 into element A field, and value $E_{i+1}$ from 814 into element E field to form the state vector output (e.g. and shifting the values of the other elements from input state vector 802 into output 803 according to Table 1). For example, the state output from message digest circuit 800 implementing round i+1 of message digest circuit 711 (on state vector input from register 709) is to be stored into register 713.

Figures 9A, 9B:
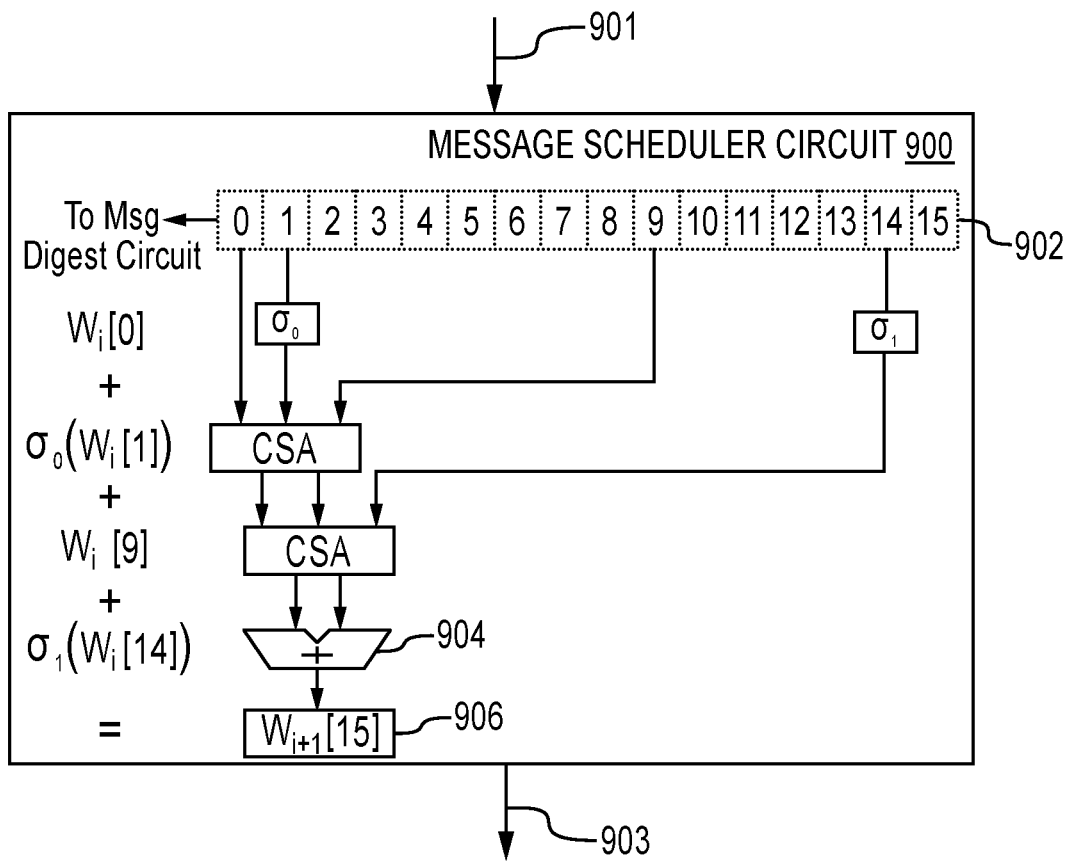
FIG. 9A illustrates a message scheduler circuit according to embodiments of the disclosure.
FIG. 9B illustrates an example logic design of the logic circuits in the message scheduler circuit in FIG. 9A according to embodiments of the disclosure.

FIG. 9A illustrates a message scheduler circuit 900 according to embodiments of the disclosure. In one embodiment, each message scheduler circuit in FIG. 7, 10, or 11 is an instance of message scheduler circuit 900, e.g., to provide the message vector value for a message digest circuit (e.g., from element position [0] of the element positions [0]-[15] of a message vector $W_i$). Depicted message scheduler circuit 900 includes an input 901 to receive a message vector ($W_i$) 902 and output at least one element (e.g., $W_{i+1}$ [15]) of the output message vector ($W_{i+1}$) 903 for that round of the hash. In one embodiment, output 903 is (only) a single element. In one embodiment, the output 903 is a vector of elements.

For example, with a new element value 906 created from message vector 902 $W_i$ and that new element value 906 stored in element position 15 of the next message vector from output 903 $W_{i+1}$ for and the element positions [1-15] from message vector $W_i$ shifted left one element (e.g., 32-bits) and stored into element positions [0-14] of the next message vector from output 903 $W_{i+1}$. In the depicted embodiment, the CSA elements are carry-save adders. In one embodiment, an adder (e.g., adder 904) add its respective addends modulo of some particular value (e.g. modulo $2^{32}$ or $2^{64}$) to produce its respective sum (e.g., element value 906).

FIG. 9B illustrates an example logic design of the $\sigma_0$ and $\sigma_1$ logic circuits in the message scheduler circuit 900 in FIG. 9A according to embodiments of the disclosure. XOR and ROTR discussed above, SHR (variable1 [index], variable2) refers to a right shift (e.g., without wrap around) of an input of (I) the element at the index of variable1 (e.g., element 0 of message vector for the current round (e.g., round 0 to 63) in message vector 902) by (II) a number of bits equal to variable2). For example, SHR($W_i$ [14],17) is to shift the element value from index 14 from message vector 902 by 17 bits to the right.

Certain embodiments of hashing accelerators (e.g. or blockchain mining circuits) use one or more fully-unrolled hash stage circuits, for example, to implement 64 or 128 pipelined circuit stages operating at the system clock frequency to consume a new nonce every clock cycle to generate a state vector, while computing a new message vector (e.g., 32-bit (word) sized element of the vector) to be subsequently consumed by a message digest circuit.

In one embodiment (e.g., as in FIG. 7), the message scheduler data path circuit (e.g., data path circuit 702) is the non-critical data path, e.g., with a worst-case delay that is around 68% of the (critical) message digest data path circuit (e.g., circuit 703). In certain unrolled-embodiments, the message scheduler data path circuit (e.g., the plurality of message scheduler circuits thereof in series) is sequential cell dominated, and thus contributes to a significant portion of register and clocking energy. Certain embodiments herein provide a fully-unrolled, hash stage circuit with a message scheduler data path circuit operating at a slower (e.g., half slower) frequency than a message digest data path circuit without compromising overall hash throughput. Instead of having a message scheduler data path circuit operating (e.g., latching data in) at a same frequency than a message digest data path circuit, certain embodiments having a message scheduler data path circuit operating at a slower (e.g., half slower) frequency than the message digest data path circuit provides an increased energy efficiency by taking advantage of the timing slack available in the message scheduler data path circuit and the fully parallelizable operations to compute two subsequent elements (e.g., words) of a message vector.

Energy consumption is the key metric in many blockchain (e.g., Bitcoin mining) accelerators, dominating the operating cost of the blockchain systems. In certain embodiments, having a message scheduler data path circuit operating at a slower (e.g., half slower) frequency than the message digest data path circuit provides a 10%-15% reduction in the power consumption on an accelerator having a message scheduler data path circuit operating (e.g., latching data in) at a same frequency than a message digest data path circuit, e.g., for an accelerator where the message scheduler data path circuit consumes about 35% of the total accelerator energy consumption, e.g., dominated mostly by sequential switching and clock power.

To maintain overall hash throughput, in one embodiment, this (e.g., frequency scaled) message scheduler data path circuit is interfaced with the message digest data path circuit by adding parallel scheduler circuits in each pipeline stage (e.g., for two hash rounds) to compute more than one (e.g., two) new message elements (e.g., words) in each cycle of the scaled clock (e.g., as in FIG. 10). To maintain overall hash throughput, in another embodiment, this (e.g., frequency scaled) message scheduler data path circuit (e.g., with time multiplexed scheduler circuits) is interfaced with the message digest data path circuit by time multiplexing the scheduler circuits (e.g., for two hash rounds) between two pipeline stages (e.g., as in FIG. 11). Certain embodiments thereof also decrease the accelerator (e.g., silicon) area utilized by the message scheduler data path circuit.

FIG. 10 illustrates a hash stage circuit 1000 that includes a message digest data path circuit 1003 and a frequency scaled message scheduler data path circuit 1002 according to embodiments of the disclosure. In one embodiment, the clock is the system clock of a system including hash stage circuit 1000. In the depicted embodiment, the frequency scaled message scheduler data path circuit 1002 includes a plurality of blocks (e.g., instances of block 1040) that output a first and second element of a state vector in the same cycle of a clock that is slower (e.g., half slower) than the (e.g., system) clock of the message digest data path circuit 1003. In one embodiment, the frequency scaled message scheduler data path circuit 1002 has a pair of (e.g., 16×32-bit) registers (e.g., Reg-0 1004 and Reg-1 1006) for alternate pipeline stages of the circuit 1000, e.g., with the data in register Reg-0 1004 and register Reg-2 1020 clocked in at the positive (or negative, in another embodiment) edge of the (reduced) frequency (e.g., half-frequency) scaled clock (e.g., clk_div_2 1202 in FIG. 12) and with the data in register Reg-1 1006 and register Reg-3 1022 clocked in at the positive (or negative, in another embodiment) edge of the inverse (e.g., logical NOT) of the (reduced) frequency (e.g., half-frequency) clock (e.g., ~clk_div_2 1203 in FIG. 12). In one embodiment where the input message vector being input into the hash stage circuit 1000 defined by the nonce changes every cycle, one of the two input registers (1004, 1006) stores a new intermediate message vector every cycle of the main clock (e.g., clk 1201 in FIG. 12), e.g., to alternate storing a new intermediate message (e.g., message 612 or message 622 in FIG. 6) into Reg-0 1004, then Reg-1 1006, then Reg-0 1004, then, Reg-1 1006, and continuing that way. In one embodiment, because the message digest data path circuit 1003 (e.g., the registers thereof) is clocked in at the positive (or negative, in another embodiment) edge by the (e.g., main 1× frequency) clock (e.g., clk 1201 in FIG. 12), multiplexers (e.g., two input, one output (2:1) multiplexer 1016 and multiplexer 1018) is included to toggle the data sent to a message digest circuit from being sourced from Reg-0 1004 or Reg-1 1006 to select the appropriate input each cycle. For instance, in the embodiment in FIG. 7, in cycle-1, stage(i) message digest circuit 707 receives an input from $W_1[0]$ of the corresponding message scheduler register 704, and in cycle-2, stage(i+1) message digest circuit 711 receives an input from $W_{i+1}[0]$ of the corresponding message scheduler register 708. Noting that the intermediate message words W[15]-W[1] in that embodiment is left shifted (e.g., by 32-bits) between subsequent pipeline stages, the frequency scaled message scheduler data path circuit 1002, stage(i) message digest circuit 1007 receives an input from W[0] of the message scheduler register 1004, but stage(i+1) message digest circuit 1011 receives (e.g., within a single cycle of the (reduced) frequency (e.g., half-frequency) scaled clock) an input from W[1] of the corresponding message scheduler register 1004 which is consistent with a (e.g., 32-bit) left shift that is generally performed between hashing rounds. Similarly, W[0] and W[1] of Reg-1 1006 are selected in subsequent cycles as input to the message digest circuits 1007 and 1011 to mimic a (e.g., 32-bit) left shift operation on the next set of intermediate messages.

In one embodiment, each intermediate message passes through the blocks (e.g., block 1040) once every two cycles of the (e.g., main 1× frequency) clock (e.g., clk 1201 in FIG. 12), two new corresponding message elements (e.g., words) instead of one are generated per pipeline stage. However, two subsequent (e.g., SHA256) message scheduler computations can be performed in parallel by message scheduler circuits 1008, 1010 and message scheduler circuits 1012, and 1014, resulting in no increase in the scheduler critical path delay of frequency scaled message scheduler data path circuit 1002 as compared to the message scheduler data path circuit 702 in FIG. 7. Further, the cycle time available for computing a new message element (e.g., word) doubles because of frequency scaling, enabling smaller device sizes and hence lower switching capacitance in these embodiments. In certain embodiments, each message scheduler circuit in FIG. 10 is an instance of message scheduler circuit 900 in FIG. 9A. In certain embodiments, each message digest circuit in FIG. 10 is an instance of message digest circuit 800 in FIG. 8A.

In one embodiment, each of (e.g., any of) hash stage circuits (608, 614, 624) in FIG. 6 are an instance of hash stage circuit 1000, for example, where input register 1005 receives the input state vector 604, 610, or 616, input registers (1004, 1006) receive alternating input message vectors (e.g., for message vectors 606, 612, or 622), respectively, and the output of the respective hash stage circuits (608, 614, 624) is state (e.g., hash) output register 1021. Depicted message digest data path circuit 1003 includes a plurality of registers (1005, 1009, 1013, 1017, 1021) clocked by (e.g., main 1× frequency) clock (e.g., clk 1201 in FIG. 12) to store state vectors of the hash stage circuit 1000 (e.g., with the initial state being input into register 1005 and the final state being output into register 1021), and a plurality of message digest circuits (1007, 1011, 1015, 1019) to perform message digest operations on state vectors (e.g., as discussed in reference to FIGS. 8A-8B). Depicted message scheduler data path circuit 1002 includes a plurality of registers (1004, 1006, 1020, 1022) to store (e.g., intermediate) message vectors of the hash stage circuit 1000 (e.g., with each initial message being input into one of register 1004 or register 1006) and the final message being output into one of register 1020 or register 1022 respectively), and a plurality of message scheduler circuits (1008, 1010, 1012, 1014, 1024, 1026, 1028, 1030) to perform message scheduler operations on (e.g., elements W[0], W[1], W[9] and W[14] and virtually shifted elements W[1], W[2], W[10] and W[15] of) message vectors (e.g., as discussed in reference to FIGS. 9A-9B).

Figure 12:
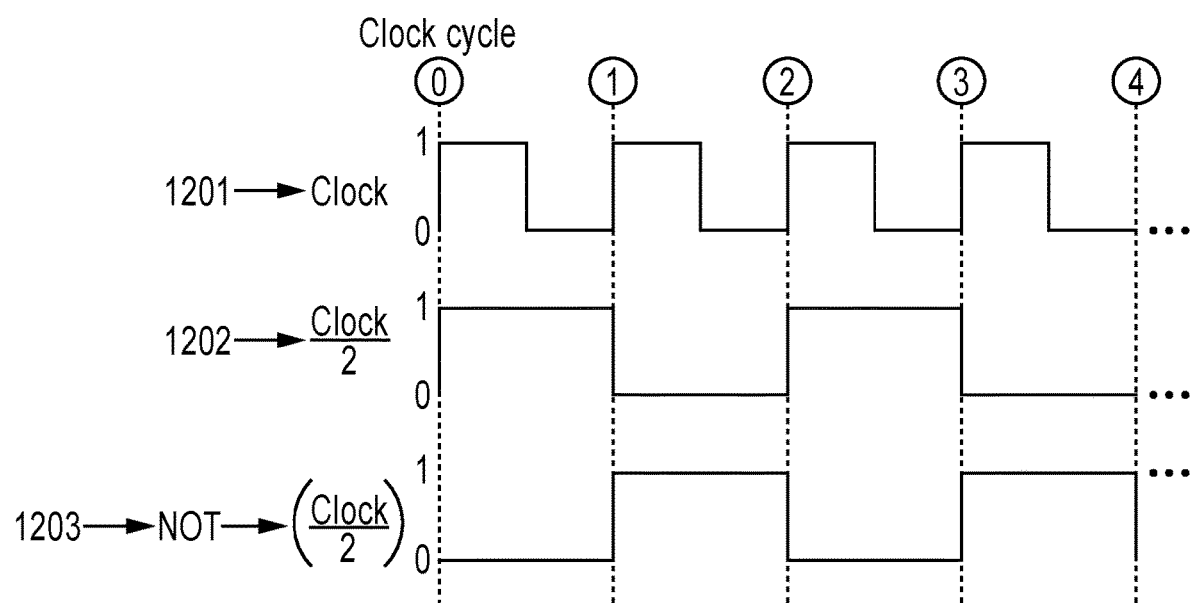
FIG. 12 illustrates a plurality of periodic square waveforms according to embodiments of the disclosure.

Note that each message digest circuit (1007, 1011, 1015, 1019) of the message digest data path circuit 1003 in this embodiment is generating an output of a new state vector for each clock cycle (e.g., clock (clk) 1201 in FIG. 12), so the multiplexers (1016, 1018, 1032, 1034) allow for elements from the appropriate intermediate message (e.g., a single nonce value) to be received by each message digest circuit (1007, 1011, 1015, 1019) from a respective register.

For example, if an intermediate value for a first nonce (nonce1) is received in register 1004 at a first clock cycle (e.g., the rising edge of cycle 0 for clock 1201 in FIG. 1, i.e., the rising edge for frequency scaled clock 1202), and a different intermediate value is received for a second nonce (nonce2) in register 1006 (e.g., the (e.g., the rising edge of cycle 1 for clock 1201 in FIG. 1, i.e., the rising edge for the inverse of the frequency scaled clock 1203), the multiplexers (1016, 1018, 1032, 1034) are controlled by the indicated clock values (e.g., frequency scaled clock 1202 for multiplexers 1016, 1032, and registers 1004, 1020 and inverse of the frequency scaled clock 1203 for multiplexers 1018, 1034, and registers 1006, 1022) to provide the values for the intermediate value for a first nonce (nonce1) to message digest data path circuit 1003, lagging in time by the values for the intermediate value for a second nonce (nonce2). Said another way, the state vectors for a single nonce stay grouped together (e.g., for the entire number of rounds of a stage) as they cascade through the circuitry in circuit 1000.

For each block 1040, message scheduler 1008 performs message scheduler operations on an intermediate message vector in register 1004 (e.g., elements W[0], W[1], W[9] and W[14] corresponding to round i) to produce an output element into element position 14 of register 1020, and message scheduler circuit 1010 performs message scheduler operations on the same intermediate message vector in register 1004 (e.g., elements W[1], W[2], W[10] and W[15] corresponding to elements W[0], W[1], W[9] and W[14] of round i+1) to produce an output element into element position 15 of register 1020. Further, the data from element positions [2-15] from message vector in register 1004 are shifted left two elements (e.g., 64-bits) and stored into element positions [0-13] of the message vector in register 1020. Further for each block 1040, message scheduler circuit 1012 performs message scheduler operations on a different (e.g., incremented nonce) intermediate message vector in register 1006 (e.g., elements W[0], W[1], W[9] and W[14] corresponding to round i) to produce an output element into element position 14 of register 1022, and message scheduler circuit 1014 performs message scheduler operations on the same intermediate message vector in register 1006 (e.g., elements W[1], W[2], W[10] and W[15] corresponding to elements W[0], W[1], W[9] and W[14] of round i+1) to produce an output element into element position 15 of register 1022. Further, the data from element positions [2-15] from message vector in register 1006 are shifted left two elements (e.g., 64-bits) and stored into element positions [0-13] of the message vector in register 1022.

Although two blocks (e.g., instances of block 1040) are shown, it should be understood that any number of rounds may be included by connecting further instances of circuitry in the circuit 1000, for example, further instances of block 1040 (and the two element shift), e.g., in series.

In one embodiment, a single hash stage circuit 1000 includes a same number of message digest circuits in a message digest data path circuit 1003 as the total number of rounds in a stage (e.g., 64 rounds) and half that same number (e.g., 32 rounds) of blocks 1040 in frequency scaled message scheduler data path circuit 1002.

In one embodiment, controller 1001 (e.g., implementing a state machine according to this disclosure) is to control the rounds of operation. In one embodiment, a set of data is clocked into the registers on each (e.g., rising or falling edge of a) clock cycle (e.g., one of the three clock waveforms in FIG. 12).

FIG. 11 illustrates a hash stage circuit 1100 that includes a message digest data path circuit 1103 and a time scaled message scheduler data path circuit 1102 according to embodiments of the disclosure. In one embodiment, the clock is the system clock of a system including hash stage circuit 1100. In the depicted embodiment, the time multiplexed and frequency scaled message scheduler data path circuit 1102 includes a plurality of blocks (e.g., instances of block 1140) that output a first and second element of a state vector in the same cycle of a clock that is slower (e.g., half slower) than the (e.g., system) clock of the message digest data path circuit 1103.

The embodiment in FIG. 10 includes two pairs of message scheduler circuits (e.g. pair of message scheduler circuits 1008 and 1010, and pair of message scheduler circuits 1012 and 1014) between each pairing of registers in series (e.g., registers 1004 and 1020, and registers 1006, 1022, respectively) to generate (e.g., generate within one cycle of (reduced) frequency scaled clock (e.g., clk_div_2 1202 and ~clk_div_2 1203 in FIG. 12, respectively)) each of the output elements (e.g., [14] and [15] in register 1020 and in register 1022, respectively).

In the embodiment depicted in FIG. 11, a single pair of message scheduler circuits (e.g. pair of message scheduler circuits 1112 and 1114 and/or pair of message scheduler circuits 1130 and 1132) are time multiplexed (e.g., via set of multiplexers 1120 for pair of message scheduler circuits 1112 and 1114 and/or via set of multiplexers 1138 for pair of message scheduler circuits 1130 and 1132) between each pairing of registers in series (e.g., registers 1104 and 1122, and registers 1108 and 1126, respectively) to generate both of the output elements (e.g., elements [14] and [15] in separately clocked subset 1124 of register Reg-2 1122 and elements [14] and [15] in separately clocked subset 1128 of register Reg-3 1126, respectively).

In certain embodiments, each message scheduler circuit in FIG. 11 is an instance of message scheduler circuit 900 in FIG. 9A. In certain embodiments, each message digest circuit in FIG. 11 is an instance of message digest circuit 800 in FIG. 8A.

In one embodiment, a time multiplexed and frequency scaled message scheduler data path circuit 1102 implements two message scheduler circuits per pipeline stage (e.g., block 1140) that is shared between two intermediate messages (e.g., in register 1104 and register 1108 respectively subsequent nonces. In certain embodiments, a multiplexer 1120 (e.g., seven 2:1 multiplexers) select inputs from Reg-0 1104 during the positive phase of (reduced) frequency scaled clock (e.g., clk_div_2 1202 in FIG. 12) to generate two new message elements (e.g., words). As depicted, these newly computed message elements (e.g., words) are written into elements [14-15] of Reg-2 1122 (e.g., subset 1124 thereof) of the subsequent pipeline stage on the negative edge of (reduced) frequency scaled clock (e.g., the positive edge of ~clk_div_2 1203 in FIG. 12). In certain embodiments, during the negative phase (e.g., at a level of 0, and not 1 of clk_div_2 1202 in FIG. 12), inputs are chosen from Reg-1 1108 and two new message elements (e.g., words) for the other (e.g., next) nonce are generated. As depicted, these newly computed message elements (e.g., words) are written into elements [14-15] of Reg-3 1126 (e.g., subset 1128 thereof) of the subsequent pipeline stage on the positive edge of (reduced) frequency scaled clock (e.g., the positive edge of clk_div_2 1202 in FIG. 12). In certain embodiments, each message scheduler circuit is to complete its computation within a half cycle of (reduced) frequency scaled clock (e.g., the positive edge of clk_div_2 1202 in FIG. 12) or within a single cycle of the unscaled clock (e.g., clock (clk) 1201 in FIG. 12). In the depicted embodiment, register 1104 includes a separately clocked subset 1106, register 1108 includes a separately clocked subset 1110, register 1122 includes a separately clocked subset 1124, and register 1126 includes a separately clocked subset 1128, e.g., clocked as indicated.

In one embodiment, each of (e.g., any of) hash stage circuits (608, 614, 624) in FIG. 6 are an instance of hash stage circuit 1100, for example, where input register 1105 receives the input state vector 604, 610, or 616, input registers (for example, registers 1104 (e.g. and 1106) and registers 1106 (e.g. and 1110) receive alternating input message vectors (e.g., for message vectors 606, 612, or 622), respectively, and the output of the respective hash stage circuits (608, 614, 624) is state (e.g., hash) output register 1121. Depicted message digest data path circuit 1103 includes a plurality of registers (1105, 1109, 1113, 1117, 1121) clocked by (e.g., main 1× frequency) clock (e.g., clk 1201 in FIG. 12) to store state vectors of the hash stage circuit 1100 (e.g., with the initial state being input into register 1105 and the final state being output into register 1121), and a plurality of message digest circuits (1107, 1111, 1115, 1119) to perform message digest operations on state vectors (e.g., as discussed in reference to FIGS. 8A-8B). Depicted message scheduler data path circuit 1102 includes a plurality of registers (1104 (e.g. and 1106), 1108 (e.g. and 1110), 1122 (e.g. and 1124), 1126 (e.g. and 1128)) to store (e.g., intermediate) message vectors of the hash stage circuit 1100 (e.g., with each initial message being input into one of 1104 (e.g. and 1106) and 1108 (e.g. and 1110) and the final message being output into one of a similar set of registers (e.g., 1122 (e.g. and 1124) or 1126 (e.g. and 1128), respectively), and a plurality of message scheduler circuits (1112, 1114, 1130, 1132) to perform message scheduler operations on (e.g., elements W[0], W[1], W[9] and W[14] and virtually shifted elements W[1], W[2], W[10] and W[15] of) message vectors (e.g., as discussed in reference to FIGS. 9A-9B).

Note that each message digest circuit (1107, 1111, 1115, 1119) of the message digest data path circuit 1103 in this embodiment is generating an output of a new state vector for each clock cycle (e.g., clock (clk) 1201 in FIG. 12), so the multiplexers (1116, 1118, 1134, 1136, 1120, and 1138) allow for elements from the appropriate intermediate message (e.g., a single nonce value) to be received by each message digest circuit (1107, 1111, 1115, 1119) from a respective register.

In one embodiment, controller 1101 (e.g., implementing a state machine according to this disclosure) is to control the rounds of operation. In one embodiment, a set of data is clocked into the registers on each (e.g., rising or falling edge of a) clock cycle (e.g., one of the three clock waveforms in FIG. 12).

FIG. 12 illustrates a plurality of periodic square waveforms (1201, 1202, 1203) according to embodiments of the disclosure. In FIG. 12, four cycles of (e.g., standard) clock 1201 are shown (as a solid line), with a logical value of 1 being high and a logical value of 0 being low. Two cycles of the (reduced) frequency scaled clock 1202 are shown (as a solid line) with a frequency that is half of clock 1201, and two cycles of the inverse (~ in the Figures) of clock 1202 are shown (as a solid line) as clock 1203.

Figure 13:
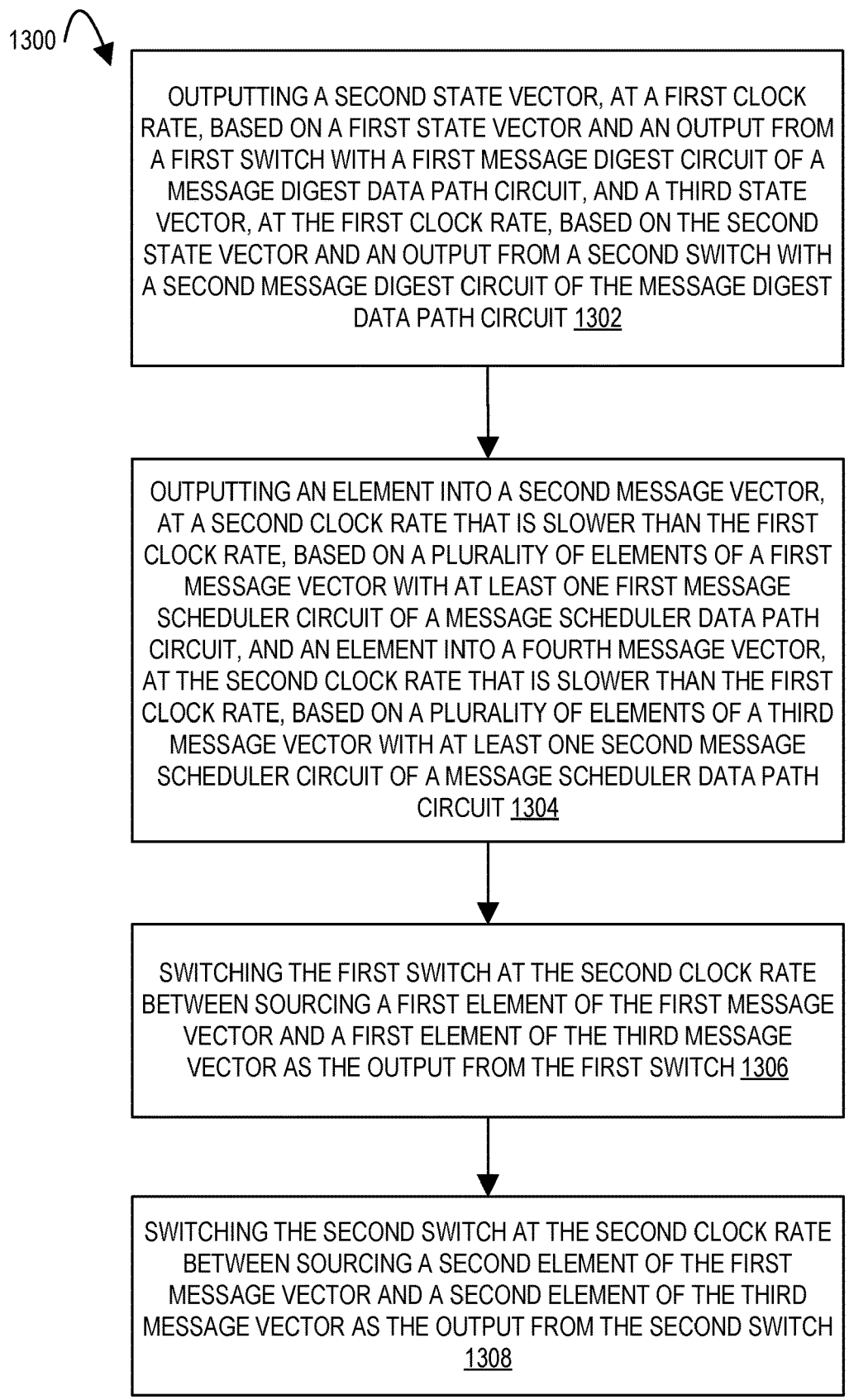
FIG. 13 illustrates a flow diagram according to embodiments of the disclosure.

FIG. 13 illustrates a flow diagram 1300 according to embodiments of the disclosure. Depicted flow 1300 includes outputting a second state vector, at a first clock rate, based on a first state vector and an output from a first switch with a first message digest circuit of a message digest data path circuit, and a third state vector, at the first clock rate, based on the second state vector and an output from a second switch with a second message digest circuit of the message digest data path circuit at 1302; outputting an element into a second message vector, at a second clock rate that is slower than the first clock rate, based on a plurality of elements of a first message vector with at least one first message scheduler circuit of a message scheduler data path circuit, and an element into a fourth message vector, at the second clock rate that is slower than the first clock rate, based on a plurality of elements of a third message vector with at least one second message scheduler circuit of a message scheduler data path circuit at 1304; switching the first switch at the second clock rate between sourcing a first element of the first message vector and a first element of the third message vector as the output from the first switch at 1306; and switching the second switch at the second clock rate between sourcing a second element of the first message vector and a second element of the third message vector as the output from the second switch at 1308.

In one embodiment, an apparatus (e.g., hardware accelerator) includes a message digest data path circuit comprising a first message digest circuit to output a second state vector, at a first clock rate, based on a first state vector and an output from a first switch, and a second message digest circuit to output a third state vector, at the first clock rate, based on the second state vector and an output from a second switch; a message scheduler data path circuit comprising at least one first message scheduler circuit to output an element into a second message vector, at a second clock rate that is slower than the first clock rate, based on a plurality of elements of a first message vector, and at least one second message scheduler circuit to output an element into a fourth message vector, at the second clock rate that is slower than the first clock rate, based on a plurality of elements of a third message vector; and a controller to switch the first switch at the second clock rate between sourcing a first element of the first message vector and a first element of the third message vector as the output from the first switch, and switch the second switch at the second clock rate between sourcing a second element of the first message vector and a second element of the third message vector as the output from the second switch. The at least one first message scheduler circuit may include a plurality of first message scheduler circuits, and one of the plurality of first message scheduler circuits outputs the element into the second message vector, at the second clock rate, based on a proper subset of the plurality of elements of the first message vector, and another of the plurality of first message scheduler circuits outputs a second element into the second message vector, at the second clock rate, based on a shifted (e.g., virtually shifted, but not physically shifted) proper subset of the plurality of elements of the first message vector. The one of the plurality of first message scheduler circuits may output the element into the second message vector and the another of the plurality of first message scheduler circuits may output the second element into the second message vector in a same clock cycle of the second clock rate. The apparatus may include a third switch to time multiplex the at least one first message scheduler circuit to output the element into the second message vector based on the plurality of elements of the first message vector and output an element into the fourth message vector based on the plurality of elements of the third message vector. The third switch may time multiplex the at least one first message scheduler circuit to output the element into the second message vector based on the plurality of elements of the first message vector and output the element into the fourth message vector based on the plurality of elements of the third message vector in a same clock cycle of the second clock rate. The controller may alternate loading a new value for the first message vector into a first register of the at least one first message scheduler circuit and a new value for the third message vector into a second register of the at least one second message scheduler circuit in consecutive cycles of the first clock rate. The controller may shift a proper subset of the plurality of elements of the first message vector into the second message vector and insert the element that is output from the at least one first message scheduler circuit into the second message vector, and shift a proper subset of the plurality of elements of the third message vector into the fourth message vector and insert the element that is output from the at least one second message scheduler circuit into the fourth message vector. Each shift magnitude may be a plurality of element positions.

In another embodiment, a method includes outputting a second state vector, at a first clock rate, based on a first state vector and an output from a first switch with a first message digest circuit of a message digest data path circuit, and a third state vector, at the first clock rate, based on the second state vector and an output from a second switch with a second message digest circuit of the message digest data path circuit; outputting an element into a second message vector, at a second clock rate that is slower than the first clock rate, based on a plurality of elements of a first message vector with at least one first message scheduler circuit of a message scheduler data path circuit, and an element into a fourth message vector, at the second clock rate that is slower than the first clock rate, based on a plurality of elements of a third message vector with at least one second message scheduler circuit of a message scheduler data path circuit; switching the first switch at the second clock rate between sourcing a first element of the first message vector and a first element of the third message vector as the output from the first switch; and switching the second switch at the second clock rate between sourcing a second element of the first message vector and a second element of the third message vector as the output from the second switch. The at least one first message scheduler circuit may include a plurality of first message scheduler circuits, and the method may further include one of the plurality of first message scheduler circuits outputting the element into the second message vector, at the second clock rate, based on a proper subset of the plurality of elements of the first message vector; and another of the plurality of first message scheduler circuits outputting a second element into the second message vector, at the second clock rate, based on a shifted proper subset of the plurality of elements of the first message vector. The one of the plurality of first message scheduler circuits may output the element into the second message vector and the another of the plurality of first message scheduler circuits outputs the second element into the second message vector in a same clock cycle of the second clock rate. The method may include time multiplexing, with a third switch, the at least one first message scheduler circuit to output the element into the second message vector based on the plurality of elements of the first message vector and output an element into the fourth message vector based on the plurality of elements of the third message vector. The third switch may time multiplex the at least one first message scheduler circuit to output the element into the second message vector based on the plurality of elements of the first message vector and output the element into the fourth message vector based on the plurality of elements of the third message vector in a same clock cycle of the second clock rate. The method may include alternately loading a new value for the first message vector into a first register of the at least one first message scheduler circuit and a new value for the third message vector into a second register of the at least one second message scheduler circuit in consecutive cycles of the first clock rate. The method may include shifting a proper subset of the plurality of elements of the first message vector into the second message vector and inserting the element that is output from the at least one first message scheduler circuit into the second message vector; and shifting a proper subset of the plurality of elements of the third message vector into the fourth message vector and inserting the element that is output from the at least one second message scheduler circuit into the fourth message vector. Each shifting magnitude may be a plurality of element positions (e.g., for a single shift operation).

In yet another embodiment, a non-transitory machine readable medium that stores code that when executed by a machine causes the machine to perform a method including outputting a second state vector, at a first clock rate, based on a first state vector and an output from a first switch with a first message digest circuit of a message digest data path circuit, and a third state vector, at the first clock rate, based on the second state vector and an output from a second switch with a second message digest circuit of the message digest data path circuit; outputting an element into a second message vector, at a second clock rate that is slower than the first clock rate, based on a plurality of elements of a first message vector with at least one first message scheduler circuit of a message scheduler data path circuit, and an element into a fourth message vector, at the second clock rate that is slower than the first clock rate, based on a plurality of elements of a third message vector with at least one second message scheduler circuit of a message scheduler data path circuit; switching the first switch at the second clock rate between sourcing a first element of the first message vector and a first element of the third message vector as the output from the first switch; and switching the second switch at the second clock rate between sourcing a second element of the first message vector and a second element of the third message vector as the output from the second switch. The at least one first message scheduler circuit may include a plurality of first message scheduler circuits, and the method may further include one of the plurality of first message scheduler circuits outputting the element into the second message vector, at the second clock rate, based on a proper subset of the plurality of elements of the first message vector; and another of the plurality of first message scheduler circuits outputting a second element into the second message vector, at the second clock rate, based on a shifted proper subset of the plurality of elements of the first message vector. The one of the plurality of first message scheduler circuits may output the element into the second message vector and the another of the plurality of first message scheduler circuits outputs the second element into the second message vector in a same clock cycle of the second clock rate. The method may include time multiplexing, with a third switch, the at least one first message scheduler circuit to output the element into the second message vector based on the plurality of elements of the first message vector and output an element into the fourth message vector based on the plurality of elements of the third message vector. The third switch may time multiplex the at least one first message scheduler circuit to output the element into the second message vector based on the plurality of elements of the first message vector and output the element into the fourth message vector based on the plurality of elements of the third message vector in a same clock cycle of the second clock rate. The method may include alternately loading a new value for the first message vector into a first register of the at least one first message scheduler circuit and a new value for the third message vector into a second register of the at least one second message scheduler circuit in consecutive cycles of the first clock rate. The method may include shifting a proper subset of the plurality of elements of the first message vector into the second message vector and inserting the element that is output from the at least one first message scheduler circuit into the second message vector; and shifting a proper subset of the plurality of elements of the third message vector into the fourth message vector and inserting the element that is output from the at least one second message scheduler circuit into the fourth message vector. Each shifting magnitude may be a plurality of element positions (e.g., for a single shift operation).

In one embodiment, a hardware accelerator includes a message digest data path circuit comprising a first message digest circuit to output a second state vector, at a first clock rate, based on a first state vector and an output from a first switch, and a second message digest circuit to output a third state vector, at the first clock rate, based on the second state vector and an output from a second switch; a message scheduler data path circuit comprising at least one first message scheduler circuit to output an element into a second message vector, at a second clock rate that is slower than the first clock rate, based on a plurality of elements of a first message vector, and at least one second message scheduler circuit to output an element into a fourth message vector, at the second clock rate that is slower than the first clock rate, based on a plurality of elements of a third message vector; and means to switch the first switch at the second clock rate between sourcing a first element of the first message vector and a first element of the third message vector as the output from the first switch, and switch the second switch at the second clock rate between sourcing a second element of the first message vector and a second element of the third message vector as the output from the second switch.

In yet another embodiment, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, May 2018; and see Intel® Architecture Instruction Set Extensions Programming Reference, May 2018).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 14A:
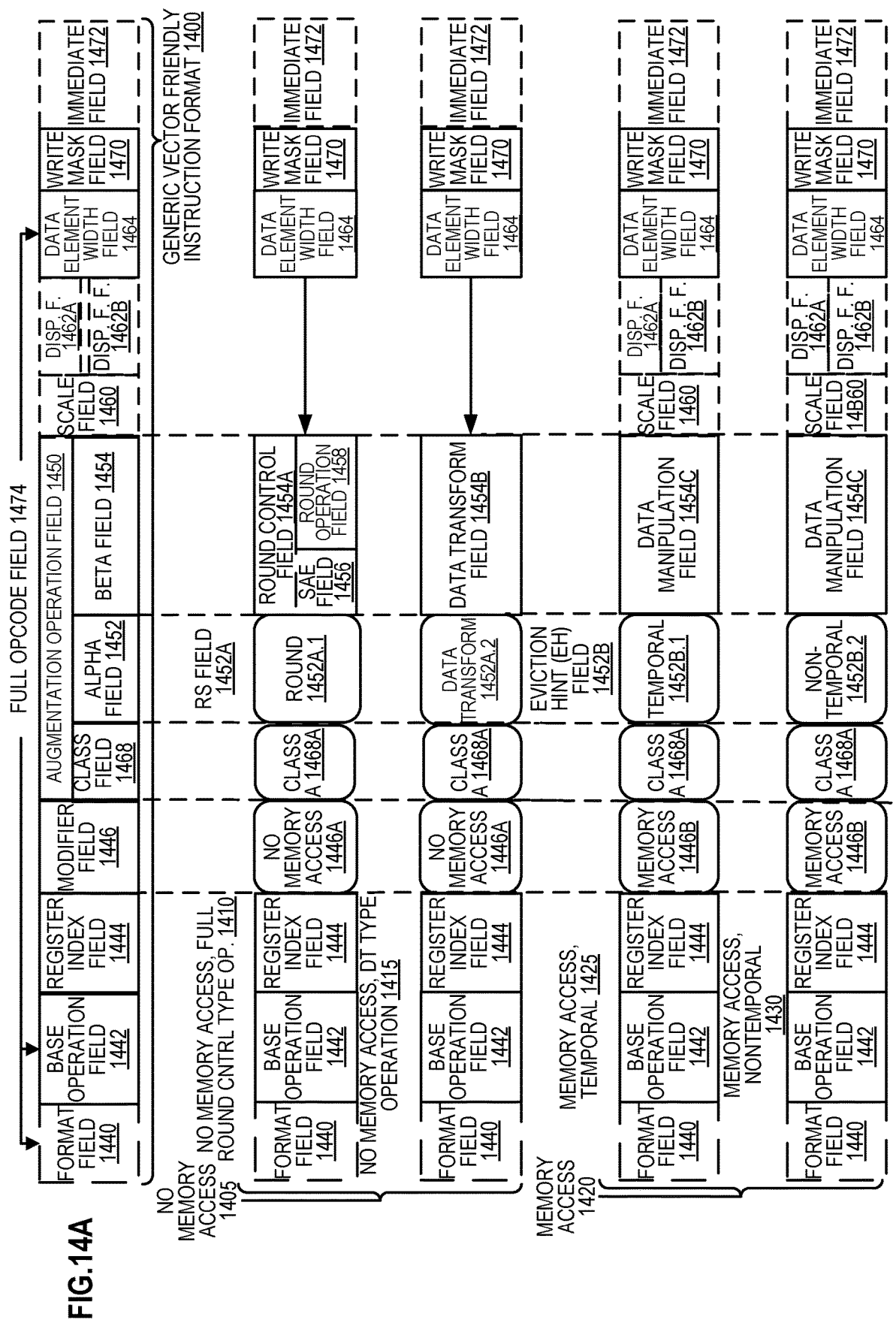
FIG. 14A is a block diagram illustrating a generic vector friendly instruction format and class A instruction templates thereof according to embodiments of the disclosure.
Figure 14B:
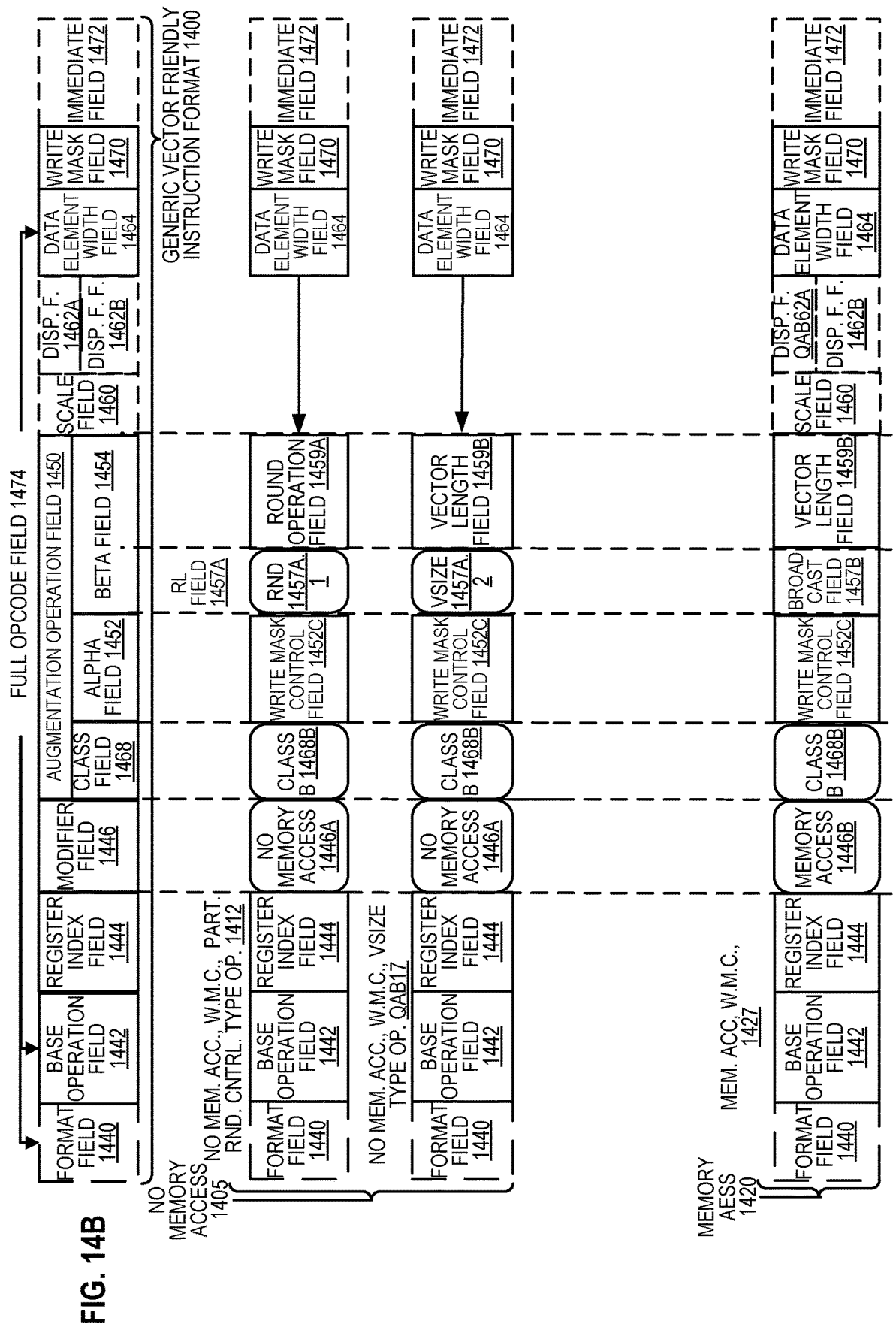
FIG. 14B is a block diagram illustrating the generic vector friendly instruction format and class B instruction templates thereof according to embodiments of the disclosure.

FIGS. 14A-14B are block diagrams illustrating a generic vector friendly instruction format and instruction templates thereof according to embodiments of the disclosure. FIG. 14A is a block diagram illustrating a generic vector friendly instruction format and class A instruction templates thereof according to embodiments of the disclosure; while FIG. 14B is a block diagram illustrating the generic vector friendly instruction format and class B instruction templates thereof according to embodiments of the disclosure. Specifically, a generic vector friendly instruction format 1400 for which are defined class A and class B instruction templates, both of which include no memory access 1405 instruction templates and memory access 1420 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 14A include: 1) within the no memory access 1405 instruction templates there is shown a no memory access, full round control type operation 1410 instruction template and a no memory access, data transform type operation 1415 instruction template; and 2) within the memory access 1420 instruction templates there is shown a memory access, temporal 1425 instruction template and a memory access, non-temporal 1430 instruction template. The class B instruction templates in FIG. 14B include: 1) within the no memory access 1405 instruction templates there is shown a no memory access, write mask control, partial round control type operation 1412 instruction template and a no memory access, write mask control, vsize type operation 1417 instruction template; and 2) within the memory access 1420 instruction templates there is shown a memory access, write mask control 1427 instruction template.

The generic vector friendly instruction format 1400 includes the following fields listed below in the order illustrated in FIGS. 14A-14B.

Format field 1440—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1442—its content distinguishes different base operations.

Register index field 1444—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1446—its content distinguishes occurrences of instructions in the generic vector instruction format that specify memory access from those that do not; that is, between no memory access 1405 instruction templates and memory access 1420 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1450—its content distinguishes which one of a variety of different operations to be performed in addition to the base operation. This field is context specific. In one embodiment of the disclosure, this field is divided into a class field 1468, an alpha field 1452, and a beta field 1454. The augmentation operation field 1450 allows common groups of operations to be performed in a single instruction rather than 2, 3, or 4 instructions.

Scale field 1460—its content allows for the scaling of the index field's content for memory address generation (e.g., for address generation that uses $2^{scale}*$index+base).

Displacement Field 1462A—its content is used as part of memory address generation (e.g., for address generation that uses $2^{scale}*$index+base+displacement).

Displacement Factor Field 1462B (note that the juxtaposition of displacement field 1462A directly over displacement factor field 1462B indicates one or the other is used)—its content is used as part of address generation; it specifies a displacement factor that is to be scaled by the size of a memory access (N)—where N is the number of bytes in the memory access (e.g., for address generation that uses $2^{scale}*$index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1474 (described later herein) and the data manipulation field 1454C. The displacement field 1462A and the displacement factor field 1462B are optional in the sense that they are not used for the no memory access 1405 instruction templates and/or different embodiments may implement only one or none of the two.

Data element width field 1464—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1470—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1470 allows for partial vector operations, including loads, stores, arithmetic, logical, etc. While embodiments of the disclosure are described in which the write mask field's 1470 content selects one of a number of write mask registers that contains the write mask to be used (and thus the write mask field's 1470 content indirectly identifies that masking to be performed), alternative embodiments instead or additional allow the mask write field's 1470 content to directly specify the masking to be performed.

Immediate field 1472—its content allows for the specification of an immediate. This field is optional in the sense that is it not present in an implementation of the generic vector friendly format that does not support immediate and it is not present in instructions that do not use an immediate.

Class field 1468—its content distinguishes between different classes of instructions. With reference to FIGS. 14A-B, the contents of this field select between class A and class B instructions. In FIGS. 14A-B, rounded corner squares are used to indicate a specific value is present in a field (e.g., class A 1468A and class B 1468B for the class field 1468 respectively in FIGS. 14A-B).

Instruction Templates of Class A

In the case of the non-memory access 1405 instruction templates of class A, the alpha field 1452 is interpreted as an RS field 1452A, whose content distinguishes which one of the different augmentation operation types are to be performed (e.g., round 1452A.1 and data transform 1452A.2 are respectively specified for the no memory access, round type operation 1410 and the no memory access, data transform type operation 1415 instruction templates), while the beta field 1454 distinguishes which of the operations of the specified type is to be performed. In the no memory access 1405 instruction templates, the scale field 1460, the displacement field 1462A, and the displacement scale filed 1462B are not present.

No-Memory Access Instruction Templates—Full Round Control Type Operation

In the no memory access full round control type operation 1410 instruction template, the beta field 1454 is interpreted as a round control field 1454A, whose content(s) provide static rounding. While in the described embodiments of the disclosure the round control field 1454A includes a suppress all floating point exceptions (SAE) field 1456 and a round operation control field 1458, alternative embodiments may support may encode both these concepts into the same field or only have one or the other of these concepts/fields (e.g., may have only the round operation control field 1458).

SAE field 1456—its content distinguishes whether or not to disable the exception event reporting; when the SAE field's 1456 content indicates suppression is enabled, a given instruction does not report any kind of floating-point exception flag and does not raise any floating point exception handler.

Round operation control field 1458—its content distinguishes which one of a group of rounding operations to perform (e.g., Round-up, Round-down, Round-towards-zero and Round-to-nearest). Thus, the round operation control field 1458 allows for the changing of the rounding mode on a per instruction basis. In one embodiment of the disclosure where a processor includes a control register for specifying rounding modes, the round operation control field's 1450 content overrides that register value.

No Memory Access Instruction Templates—Data Transform Type Operation

In the no memory access data transform type operation 1415 instruction template, the beta field 1454 is interpreted as a data transform field 1454B, whose content distinguishes which one of a number of data transforms is to be performed (e.g., no data transform, swizzle, broadcast).

In the case of a memory access 1420 instruction template of class A, the alpha field 1452 is interpreted as an eviction hint field 1452B, whose content distinguishes which one of the eviction hints is to be used (in FIG. 14A, temporal 1452B.1 and non-temporal 1452B.2 are respectively specified for the memory access, temporal 1425 instruction template and the memory access, non-temporal 1430 instruction template), while the beta field 1454 is interpreted as a data manipulation field 1454C, whose content distinguishes which one of a number of data manipulation operations (also known as primitives) is to be performed (e.g., no manipulation; broadcast; up conversion of a source; and down conversion of a destination). The memory access 1420 instruction templates include the scale field 1460, and optionally the displacement field 1462A or the displacement scale field 1462B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1452 is interpreted as a write mask control (Z) field 1452C, whose content distinguishes whether the write masking controlled by the write mask field 1470 should be a merging or a zeroing.

In the case of the non-memory access 1405 instruction templates of class B, part of the beta field 1454 is interpreted as an RL field 1457A, whose content distinguishes which one of the different augmentation operation types are to be performed (e.g., round 1457A.1 and vector length (VSIZE) 1457A.2 are respectively specified for the no memory access, write mask control, partial round control type operation 1412 instruction template and the no memory access, write mask control, VSIZE type operation 1417 instruction template), while the rest of the beta field 1454 distinguishes which of the operations of the specified type is to be performed. In the no memory access 1405 instruction templates, the scale field 1460, the displacement field 1462A, and the displacement scale filed 1462B are not present.

In the no memory access, write mask control, partial round control type operation 1410 instruction template, the rest of the beta field 1454 is interpreted as a round operation field 1459A and exception event reporting is disabled (a given instruction does not report any kind of floating-point exception flag and does not raise any floating point exception handler).

Round operation control field 1459A—just as round operation control field 1458, its content distinguishes which one of a group of rounding operations to perform (e.g., Round-up, Round-down, Round-towards-zero and Round-to-nearest). Thus, the round operation control field 1459A allows for the changing of the rounding mode on a per instruction basis. In one embodiment of the disclosure where a processor includes a control register for specifying rounding modes, the round operation control field's 1450 content overrides that register value.

In the no memory access, write mask control, VSIZE type operation 1417 instruction template, the rest of the beta field 1454 is interpreted as a vector length field 1459B, whose content distinguishes which one of a number of data vector lengths is to be performed on (e.g., 128, 256, or 512 byte).

In the case of a memory access 1420 instruction template of class B, part of the beta field 1454 is interpreted as a broadcast field 1457B, whose content distinguishes whether or not the broadcast type data manipulation operation is to be performed, while the rest of the beta field 1454 is interpreted the vector length field 1459B. The memory access 1420 instruction templates include the scale field 1460, and optionally the displacement field 1462A or the displacement scale field 1462B.

With regard to the generic vector friendly instruction format 1400, a full opcode field 1474 is shown including the format field 1440, the base operation field 1442, and the data element width field 1464. While one embodiment is shown where the full opcode field 1474 includes all of these fields, the full opcode field 1474 includes less than all of these fields in embodiments that do not support all of them. The full opcode field 1474 provides the operation code (opcode).

The augmentation operation field 1450, the data element width field 1464, and the write mask field 1470 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 15 is a block diagram illustrating an exemplary specific vector friendly instruction format according to embodiments of the disclosure. FIG. 15 shows a specific vector friendly instruction format 1500 that is specific in the sense that it specifies the location, size, interpretation, and order of the fields, as well as values for some of those fields. The specific vector friendly instruction format 1500 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 14 into which the fields from FIG. 15 map are illustrated.

It should be understood that, although embodiments of the disclosure are described with reference to the specific vector friendly instruction format 1500 in the context of the generic vector friendly instruction format 1400 for illustrative purposes, the disclosure is not limited to the specific vector friendly instruction format 1500 except where claimed. For example, the generic vector friendly instruction format 1400 contemplates a variety of possible sizes for the various fields, while the specific vector friendly instruction format 1500 is shown as having fields of specific sizes. By way of specific example, while the data element width field 1464 is illustrated as a one bit field in the specific vector friendly instruction format 1500, the disclosure is not so limited (that is, the generic vector friendly instruction format 1400 contemplates other sizes of the data element width field 1464).

The generic vector friendly instruction format 1400 includes the following fields listed below in the order illustrated in FIG. 15A.

EVEX Prefix (Bytes 0-3) 1502—is encoded in a four-byte form.

Format Field 1440 (EVEX Byte 0, bits [7:0])—the first byte (EVEX Byte 0) is the format field 1440 and it contains 0x62 (the unique value used for distinguishing the vector friendly instruction format in one embodiment of the disclosure).

The second-fourth bytes (EVEX Bytes 1-3) include a number of bit fields providing specific capability.

REX field 1505 (EVEX Byte 1, bits [7-5])—consists of a EVEX.R bit field (EVEX Byte 1, bit [7]-R), EVEX.X bit field (EVEX byte 1, bit [6]-X), and 1457BEX byte 1, bit[5]—B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1410—this is the first part of the REX' field 1410 and is the EVEX.R' bit field (EVEX Byte 1, bit [4]-R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1515 (EVEX byte 1, bits [3:0]-mmmm)—its content encodes an implied leading opcode byte (0F, 0F 38, or 0F 3).

Data element width field 1464 (EVEX byte 2, bit [7]-W)—is represented by the notation EVEX.W. EVEX.W is used to define the granularity (size) of the datatype (either 32-bit data elements or 64-bit data elements).

EVEX.vvvv 1520 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 1520 encodes the 4 low-order bits of the first source register specifier stored in inverted (1s complement) form. Depending on the instruction, an extra different EVEX bit field is used to extend the specifier size to 32 registers.

EVEX.U 1468 Class field (EVEX byte 2, bit [2]-U)—If EVEX.U=0, it indicates class A or EVEX.U0; if EVEX.U=1, it indicates class B or EVEX.U1.

Prefix encoding field 1525 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1452 (EVEX byte 3, bit [7]-EH; also known as EVEX.EH, EVEX.rs, EVEX.RL, EVEX.write mask control, and EVEX.N; also illustrated with α)—as previously described, this field is context specific.

Beta field 1454 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 1410—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1470 (EVEX byte 3, bits [2:0]-kkk)—its content specifies the index of a register in the write mask registers as previously described. In one embodiment of the disclosure, the specific value EVEX kkk=000 has a special behavior implying no write mask is used for the particular instruction (this may be implemented in a variety of ways including the use of a write mask hardwired to all ones or hardware that bypasses the masking hardware).

Real Opcode Field 1530 (Byte 4) is also known as the opcode byte. Part of the opcode is specified in this field.

MOD R/M Field 1540 (Byte 5) includes MOD field 1542, Reg field 1544, and R/M field 1546. As previously described, the MOD field's 1542 content distinguishes between memory access and non-memory access operations. The role of Reg field 1544 can be summarized to two situations: encoding either the destination register operand or a source register operand, or be treated as an opcode extension and not used to encode any instruction operand. The role of R/M field 1546 may include the following: encoding the instruction operand that references a memory address, or encoding either the destination register operand or a source register operand.

Scale, Index, Base (SIB) Byte (Byte 6)—As previously described, the scale field's 1450 content is used for memory address generation. SIB.xxx 1554 and SIB.bbb 1556—the contents of these fields have been previously referred to with regard to the register indexes Xxxx and Bbbb.

Displacement field 1462A (Bytes 7-10)—when MOD field 1542 contains 10, bytes 7-10 are the displacement field 1462A, and it works the same as the legacy 32-bit displacement (disp32) and works at byte granularity.

Displacement factor field 1462B (Byte 7)—when MOD field 1542 contains 01, byte 7 is the displacement factor field 1462B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1462B is a reinterpretation of disp8; when using displacement factor field 1462B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1462B substitutes the legacy x86 instruction set 8-bit displacement. Thus, the displacement factor field 1462B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 1472 operates as previously described.

Full Opcode Field

FIG. 15B is a block diagram illustrating the fields of the specific vector friendly instruction format 1500 that make up the full opcode field 1474 according to one embodiment of the disclosure. Specifically, the full opcode field 1474 includes the format field 1440, the base operation field 1442, and the data element width (W) field 1464. The base operation field 1442 includes the prefix encoding field 1525, the opcode map field 1515, and the real opcode field 1530.

Register Index Field

FIG. 15C is a block diagram illustrating the fields of the specific vector friendly instruction format 1500 that make up the register index field 1444 according to one embodiment of the disclosure. Specifically, the register index field 1444 includes the REX field 1505, the REX' field 1510, the MODR/M.reg field 1544, the MODR/M.r/m field 1546, the VVVV field 1520, xxx field 1554, and the bbb field 1556.

Augmentation Operation Field

Figure 15D:
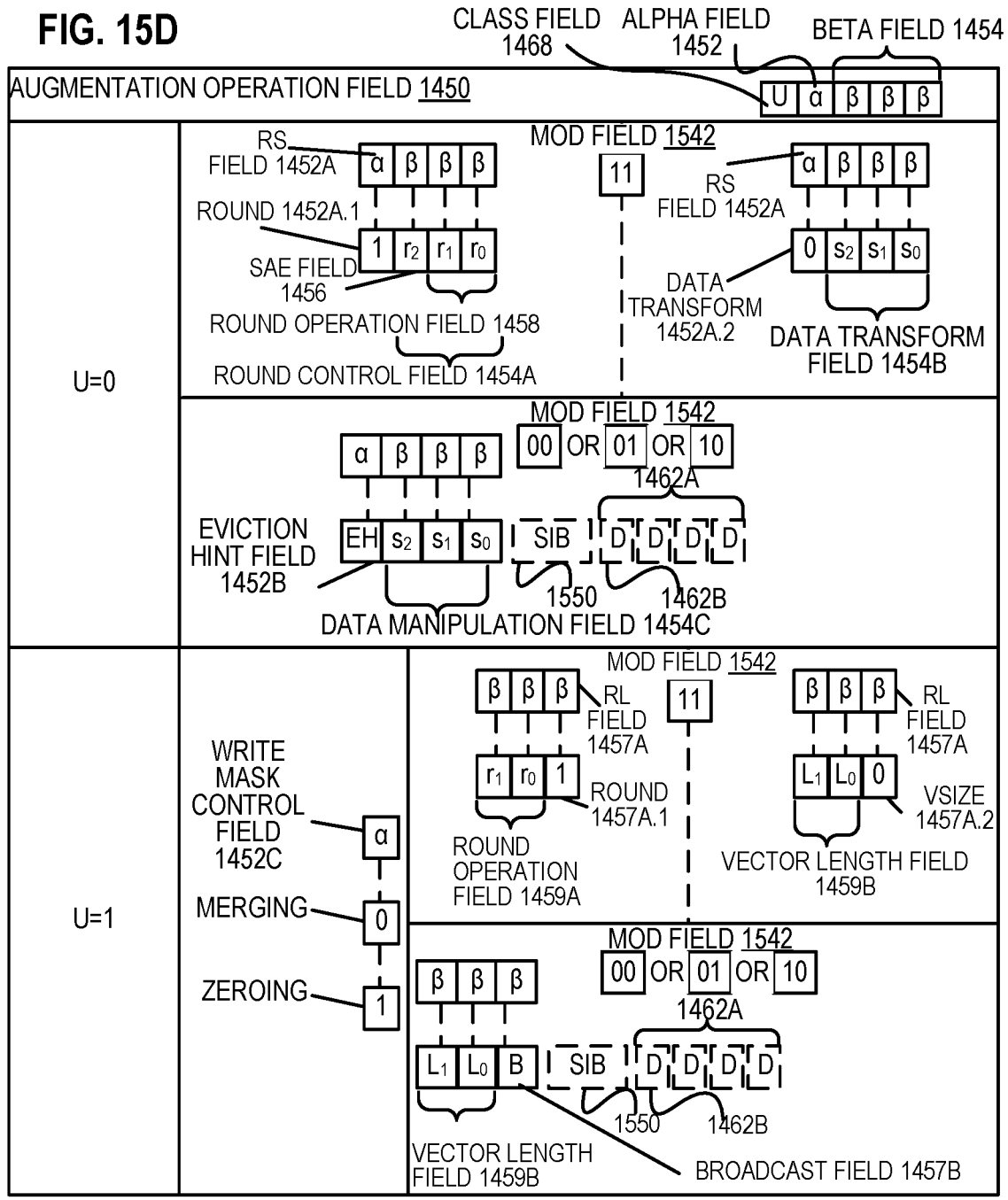
FIG. 15D is a block diagram illustrating the fields of the specific vector friendly instruction format in FIG. 15A that make up the augmentation operation field 1450 according to one embodiment of the disclosure.

FIG. 15D is a block diagram illustrating the fields of the specific vector friendly instruction format 1500 that make up the augmentation operation field 1450 according to one embodiment of the disclosure. When the class (U) field 1468 contains 0, it signifies EVEX.U0 (class A 1468A); when it contains 1, it signifies EVEX.U1 (class B 1468B). When U=0 and the MOD field 1542 contains 11 (signifying a no memory access operation), the alpha field 1452 (EVEX byte 3, bit [7]-EH) is interpreted as the rs field 1452A. When the rs field 1452A contains a 1 (round 1452A.1), the beta field 1454 (EVEX byte 3, bits [6:4]-SSS) is interpreted as the round control field 1454A. The round control field 1454A includes a one bit SAE field 1456 and a two bit round operation field 1458. When the rs field 1452A contains a 0 (data transform 1452A.2), the beta field 1454 (EVEX byte 3, bits [6:4]-SSS) is interpreted as a three bit data transform field 1454B. When U=0 and the MOD field 1542 contains 00, 01, or 10 (signifying a memory access operation), the alpha field 1452 (EVEX byte 3, bit [7]-EH) is interpreted as the eviction hint (EH) field 1452B and the beta field 1454 (EVEX byte 3, bits [6:4]-SSS) is interpreted as a three bit data manipulation field 1454C.

When U=1, the alpha field 1452 (EVEX byte 3, bit [7]-EH) is interpreted as the write mask control (Z) field 1452C. When U=1 and the MOD field 1542 contains 11 (signifying a no memory access operation), part of the beta field 1454 (EVEX byte 3, bit [4]-$S_0$) is interpreted as the RL field 1457A; when it contains a 1 (round 1457A.1) the rest of the beta field 1454 (EVEX byte 3, bit [6-5]-$S_{2-1}$) is interpreted as the round operation field 1459A, while when the RL field 1457A contains a 0 (VSIZE 1457.A2) the rest of the beta field 1454 (EVEX byte 3, bit [6-5]-$S_{2-1}$) is interpreted as the vector length field 1459B (EVEX byte 3, bit [6-5]-$L_{1-0}$). When U=1 and the MOD field 1542 contains 00, 01, or 10 (signifying a memory access operation), the beta field 1454 (EVEX byte 3, bits [6:4]-SSS) is interpreted as the vector length field 1459B (EVEX byte 3, bit [6-5]-$L_{1-0}$) and the broadcast field 1457B (EVEX byte 3, bit [4]-B).

Exemplary Register Architecture

Figure 16:
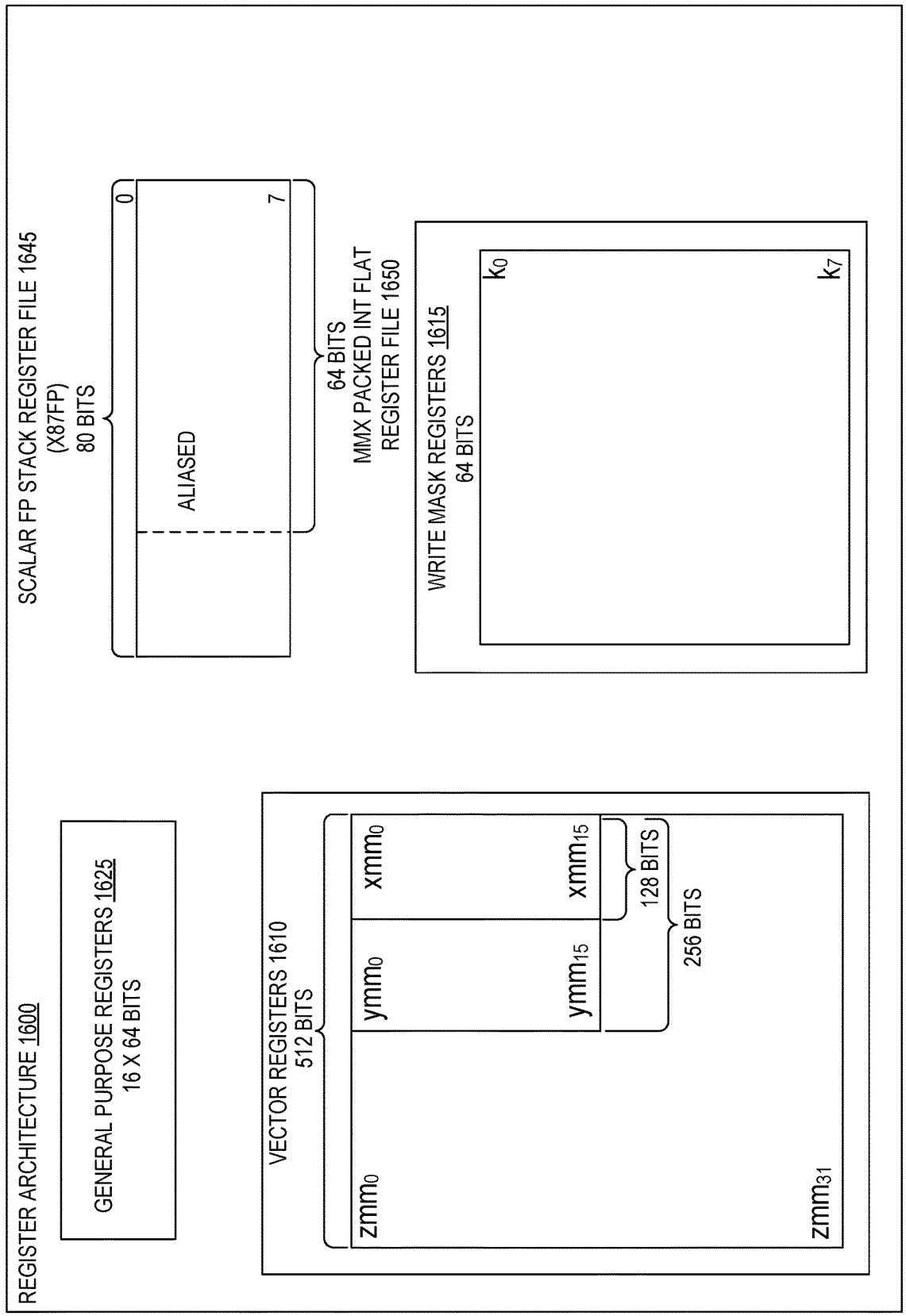
FIG. 16 is a block diagram of a register architecture according to one embodiment of the disclosure

FIG. 16 is a block diagram of a register architecture 1600 according to one embodiment of the disclosure. In the embodiment illustrated, there are 32 vector registers 1610 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1500 operates on these overlaid register file as illustrated in the below tables.

| Adjustable Vector Length | Class | Operations | Registers |
|---|---|---|---|
| Instruction Templates that do not include the vector length field 1459B | A (FIG. 14A; U = 0) | 1410, 1415, 1425, 1430 | zmm registers (the vector length is 64 byte) |
| | B (FIG. 14B; U = 1) | 1412 | zmm registers (the vector length is 64 byte) |
| Instruction templates that do include the vector length field 1459B | B (FIG. 14B; U = 1) | 1417, 1427 | zmm, ymm, or xmm registers (the vector length is 64 byte, 32 byte, or 16 byte) depending on the vector length field 1459B |

In other words, the vector length field 1459B selects between a maximum length and one or more other shorter lengths, where each such shorter length is half the length of the preceding length; and instructions templates without the vector length field 1459B operate on the maximum vector length. Further, in one embodiment, the class B instruction templates of the specific vector friendly instruction format 1500 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1615—in the embodiment illustrated, there are 8 write mask registers (k0 through k7), each 64 bits in size. In an alternate embodiment, the write mask registers 1615 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 1625—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1645, on which is aliased the MMX packed integer flat register file 1650—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 17A is a block diagram illustrating both an exemplary in-order pipeline and an exemplary register renaming, out-of-order issue/execution pipeline according to embodiments of the disclosure. FIG. 17B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 17A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 17A, a processor pipeline 1700 includes a fetch stage 1702, a length decode stage 1704, a decode stage 1706, an allocation stage 1708, a renaming stage 1710, a scheduling (also known as a dispatch or issue) stage 1712, a register read/memory read stage 1714, an execute stage 1716, a write back/memory write stage 1718, an exception handling stage 1722, and a commit stage 1724.

FIG. 17B shows processor core 1790 including a front end unit 1730 coupled to an execution engine unit 1750, and both are coupled to a memory unit 1770. The core 1790 may be a reduced instruction set computing (RISC) core, a complex instruction set computing (CISC) core, a very long instruction word (VLIW) core, or a hybrid or alternative core type. As yet another option, the core 1790 may be a special-purpose core, such as, for example, a network or communication core, compression engine, coprocessor core, general purpose computing graphics processing unit (GPGPU) core, graphics core, or the like.

The front end unit 1730 includes a branch prediction unit 1732 coupled to an instruction cache unit 1734, which is coupled to an instruction translation lookaside buffer (TLB) 1736, which is coupled to an instruction fetch unit 1738, which is coupled to a decode unit 1740. The decode unit 1740 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 1740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1790 includes a microcode ROM or other medium that stores microcode for certain macro-instructions (e.g., in decode unit 1740 or otherwise within the front end unit 1730). The decode unit 1740 is coupled to a rename/allocator unit 1752 in the execution engine unit 1750.

The execution engine unit 1750 includes the rename/allocator unit 1752 coupled to a retirement unit 1754 and a set of one or more scheduler unit(s) 1756. The scheduler unit(s) 1756 represents any number of different schedulers, including reservations stations, central instruction window, etc. The scheduler unit(s) 1756 is coupled to the physical register file(s) unit(s) 1758. Each of the physical register file(s) units 1758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1758 comprises a vector registers unit, a write mask registers unit, and a scalar registers unit. These register units may provide architectural vector registers, vector mask registers, and general purpose registers. The physical register file(s) unit(s) 1758 is overlapped by the retirement unit 1754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1754 and the physical register file(s) unit(s) 1758 are coupled to the execution cluster(s) 1760. The execution cluster(s) 1760 includes a set of one or more execution units 1762 and a set of one or more memory access units 1764. The execution units 1762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1756, physical register file(s) unit(s) 1758, and execution cluster(s) 1760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1764). It should also be understood that where separate pipelines are used, one or more of these pipelines may be out-of-order issue/execution and the rest in-order.

The set of memory access units 1764 is coupled to the memory unit 1770, which includes a data TLB unit 1772 coupled to a data cache unit 1774 coupled to a level 2 (L2) cache unit 1776. In one exemplary embodiment, the memory access units 1764 may include a load unit, a store address unit, and a store data unit, each of which is coupled to the data TLB unit 1772 in the memory unit 1770. The instruction cache unit 1734 is further coupled to a level 2 (L2) cache unit 1776 in the memory unit 1770. The L2 cache unit 1776 is coupled to one or more other levels of cache and eventually to a main memory.

By way of example, the exemplary register renaming, out-of-order issue/execution core architecture may implement the pipeline 1700 as follows: 1) the instruction fetch 1738 performs the fetch and length decoding stages 1702 and 1704; 2) the decode unit 1740 performs the decode stage 1706; 3) the rename/allocator unit 1752 performs the allocation stage 1708 and renaming stage 1710; 4) the scheduler unit(s) 1756 performs the schedule stage 1712; 5) the physical register file(s) unit(s) 1758 and the memory unit 1770 perform the register read/memory read stage 1714; the execution cluster 1760 perform the execute stage 1716; 6) the memory unit 1770 and the physical register file(s) unit(s) 1758 perform the write back/memory write stage 1718; 7) various units may be involved in the exception handling stage 1722; and 8) the retirement unit 1754 and the physical register file(s) unit(s) 1758 perform the commit stage 1724.

The core 1790 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1790 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading technology).

While register renaming is described in the context of out-of-order execution, it should be understood that register renaming may be used in an in-order architecture. While the illustrated embodiment of the processor also includes separate instruction and data cache units 1734/1774 and a shared L2 cache unit 1776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 18B:
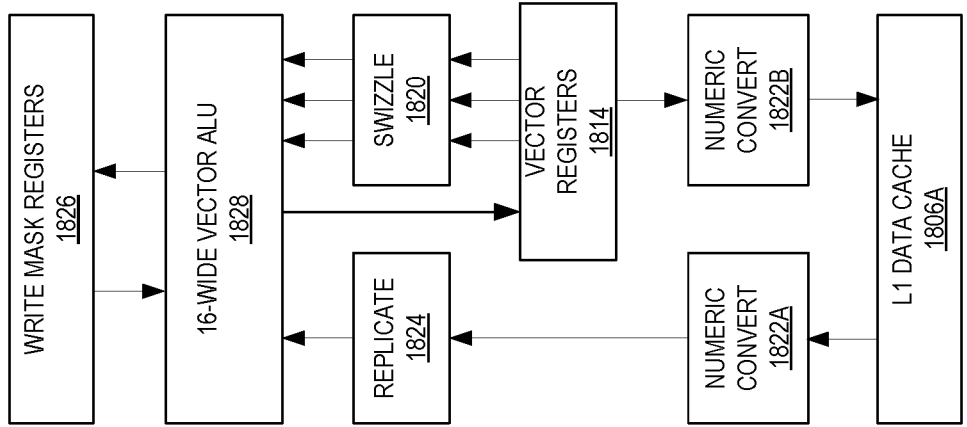
FIG. 18B is an expanded view of part of the processor core in FIG. 18A according to embodiments of the disclosure.
Figure 18A:
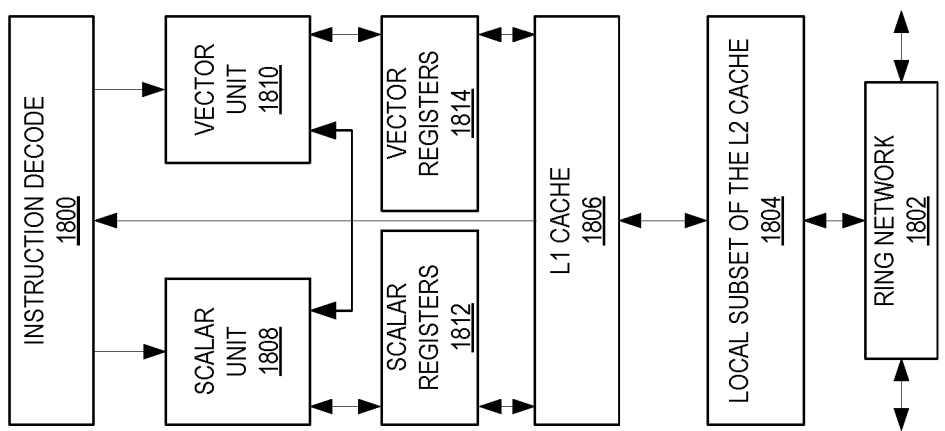
FIG. 18A is a block diagram of a single processor core, along with its connection to the on-die interconnect network and with its local subset of the Level 2 (L2) cache, according to embodiments of the disclosure.

FIGS. 18A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 18A is a block diagram of a single processor core, along with its connection to the on-die interconnect network 1802 and with its local subset of the Level 2 (L2) cache 1804, according to embodiments of the disclosure. In one embodiment, an instruction decode unit 1800 supports the x86 instruction set with a packed data instruction set extension. An L1 cache 1806 allows low-latency accesses to cache memory into the scalar and vector units. While in one embodiment (to simplify the design), a scalar unit 1808 and a vector unit 1810 use separate register sets (respectively, scalar registers 1812 and vector registers 1814) and data transferred between them is written to memory and then read back in from a level 1 (L1) cache 1806, alternative embodiments of the disclosure may use a different approach (e.g., use a single register set or include a communication path that allow data to be transferred between the two register files without being written and read back).

The local subset of the L2 cache 1804 is part of a global L2 cache that is divided into separate local subsets, one per processor core. Each processor core has a direct access path to its own local subset of the L2 cache 1804. Data read by a processor core is stored in its L2 cache subset 1804 and can be accessed quickly, in parallel with other processor cores accessing their own local L2 cache subsets. Data written by a processor core is stored in its own L2 cache subset 1804 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bit wide per direction.

FIG. 18B is an expanded view of part of the processor core in FIG. 18A according to embodiments of the disclosure. FIG. 18B includes an L1 data cache 1806A part of the L1 cache 1804, as well as more detail regarding the vector unit 1810 and the vector registers 1814. Specifically, the vector unit 1810 is a 16-wide vector processing unit (VPU) (see the 16-wide ALU 1828), which executes one or more of integer, single-precision float, and double-precision float instructions. The VPU supports swizzling the register inputs with swizzle unit 1820, numeric conversion with numeric convert units 1822A-B, and replication with replication unit 1824 on the memory input. Write mask registers 1826 allow predicating resulting vector writes.

Figure 19:
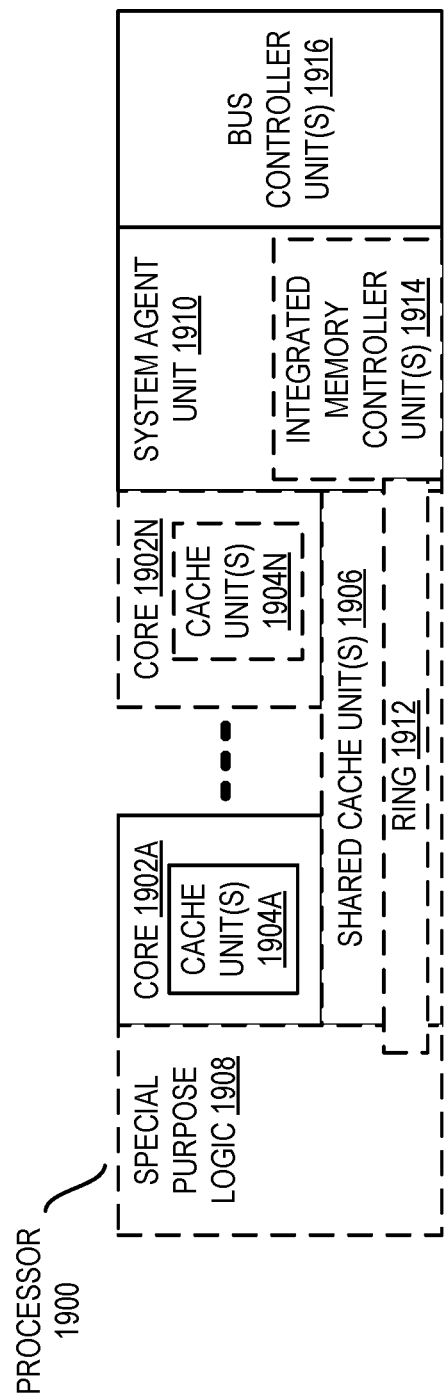
FIG. 19 is a block diagram of a processor that may have more than one core, may have an integrated memory controller, and may have integrated graphics according to embodiments of the disclosure.

FIG. 19 is a block diagram of a processor 1900 that may have more than one core, may have an integrated memory controller, and may have integrated graphics according to embodiments of the disclosure. The solid lined boxes in FIG. 19 illustrate a processor 1900 with a single core 1902A, a system agent 1910, a set of one or more bus controller units 1916, while the optional addition of the dashed lined boxes illustrates an alternative processor 1900 with multiple cores 1902A-N, a set of one or more integrated memory controller unit(s) 1914 in the system agent unit 1910, and special purpose logic 1908.

Thus, different implementations of the processor 1900 may include: 1) a CPU with the special purpose logic 1908 being integrated graphics and/or scientific (throughput) logic (which may include one or more cores), and the cores 1902A-N being one or more general purpose cores (e.g., general purpose in-order cores, general purpose out-of-order cores, a combination of the two); 2) a coprocessor with the cores 1902A-N being a large number of special purpose cores intended primarily for graphics and/or scientific (throughput); and 3) a coprocessor with the cores 1902A-N being a large number of general purpose in-order cores. Thus, the processor 1900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1900 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1906, and external memory (not shown) coupled to the set of integrated memory controller units 1914. The set of shared cache units 1906 may include one or more mid-level caches, such as level 2 (L2), level 3 (L3), level 4 (L4), or other levels of cache, a last level cache (LLC), and/or combinations thereof. While in one embodiment a ring based interconnect unit 1912 interconnects the integrated graphics logic 1908, the set of shared cache units 1906, and the system agent unit 1910/integrated memory controller unit(s) 1914, alternative embodiments may use any number of well-known techniques for interconnecting such units. In one embodiment, coherency is maintained between one or more cache units 1906 and cores 1902-A-N.

In some embodiments, one or more of the cores 1902A-N are capable of multithreading. The system agent 1910 includes those components coordinating and operating cores 1902A-N. The system agent unit 1910 may include for example a power control unit (PCU) and a display unit. The PCU may be or include logic and components needed for regulating the power state of the cores 1902A-N and the integrated graphics logic 1908. The display unit is for driving one or more externally connected displays.

The cores 1902A-N may be homogenous or heterogeneous in terms of architecture instruction set; that is, two or more of the cores 1902A-N may be capable of execution the same instruction set, while others may be capable of executing only a subset of that instruction set or a different instruction set.

Exemplary Computer Architectures

FIGS. 20-23 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 20:
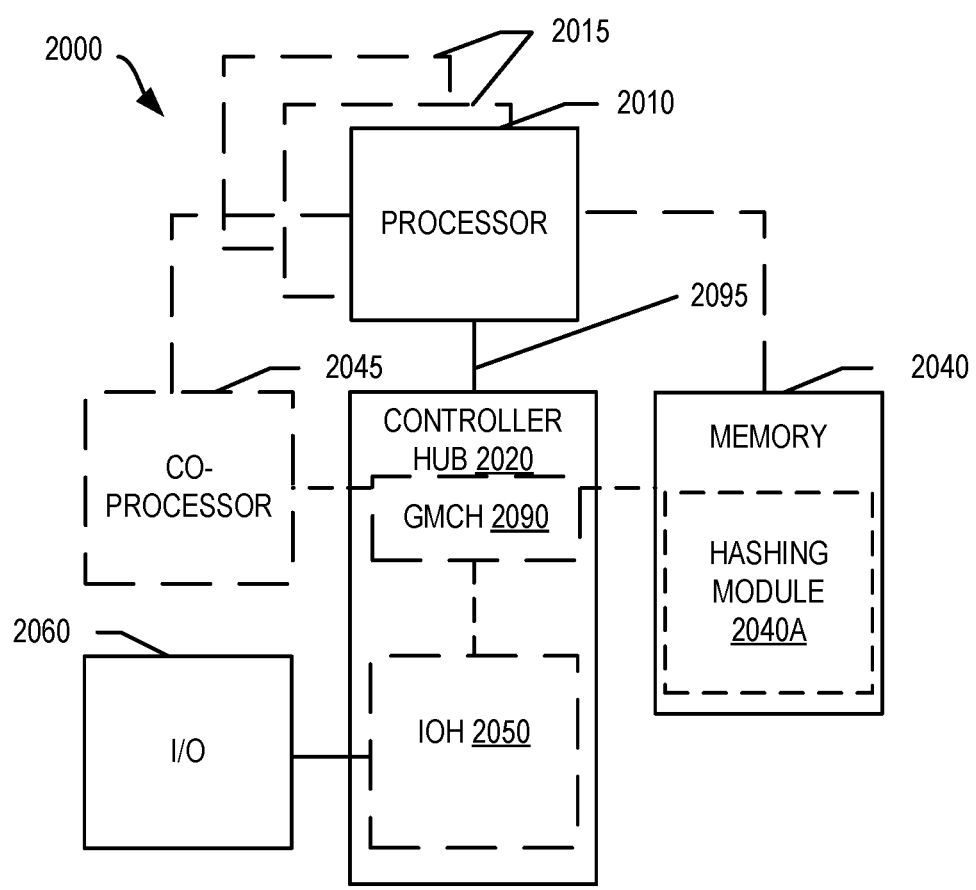
FIG. 20 is a block diagram of a system in accordance with one embodiment of the present disclosure.

Referring now to FIG. 20, shown is a block diagram of a system 2000 in accordance with one embodiment of the present disclosure. The system 2000 may include one or more processors 2010, 2015, which are coupled to a controller hub 2020. In one embodiment the controller hub 2020 includes a graphics memory controller hub (GMCH) 2090 and an Input/Output Hub (IOH) 2050 (which may be on separate chips); the GMCH 2090 includes memory and graphics controllers to which are coupled memory 2040 and a coprocessor 2045; the IOH 2050 is couples input/output (I/O) devices 2060 to the GMCH 2090. Alternatively, one or both of the memory and graphics controllers are integrated within the processor (as described herein), the memory 2040 and the coprocessor 2045 are coupled directly to the processor 2010, and the controller hub 2020 in a single chip with the IOH 2050. Memory 2040 may include a hashing module 2040A, for example, to store code that when executed causes a processor to perform any method of this disclosure.

The optional nature of additional processors 2015 is denoted in FIG. 20 with broken lines. Each processor 2010, 2015 may include one or more of the processing cores described herein and may be some version of the processor 1900.

The memory 2040 may be, for example, dynamic random access memory (DRAM), phase change memory (PCM), or a combination of the two. For at least one embodiment, the controller hub 2020 communicates with the processor(s) 2010, 2015 via a multi-drop bus, such as a frontside bus (FSB), point-to-point interface such as Quickpath Interconnect (QPI), or similar connection 2095.

In one embodiment, the coprocessor 2045 is a special-purpose processor, such as, for example, a high-throughput MIC processor, a network or communication processor, compression engine, graphics processor, GPGPU, embedded processor, or the like. In one embodiment, controller hub 2020 may include an integrated graphics accelerator.

There can be a variety of differences between the physical resources 2010, 2015 in terms of a spectrum of metrics of merit including architectural, microarchitectural, thermal, power consumption characteristics, and the like.

In one embodiment, the processor 2010 executes instructions that control data processing operations of a general type. Embedded within the instructions may be coprocessor instructions. The processor 2010 recognizes these coprocessor instructions as being of a type that should be executed by the attached coprocessor 2045. Accordingly, the processor 2010 issues these coprocessor instructions (or control signals representing coprocessor instructions) on a coprocessor bus or other interconnect, to coprocessor 2045. Coprocessor(s) 2045 accept and execute the received coprocessor instructions.

Figure 21:
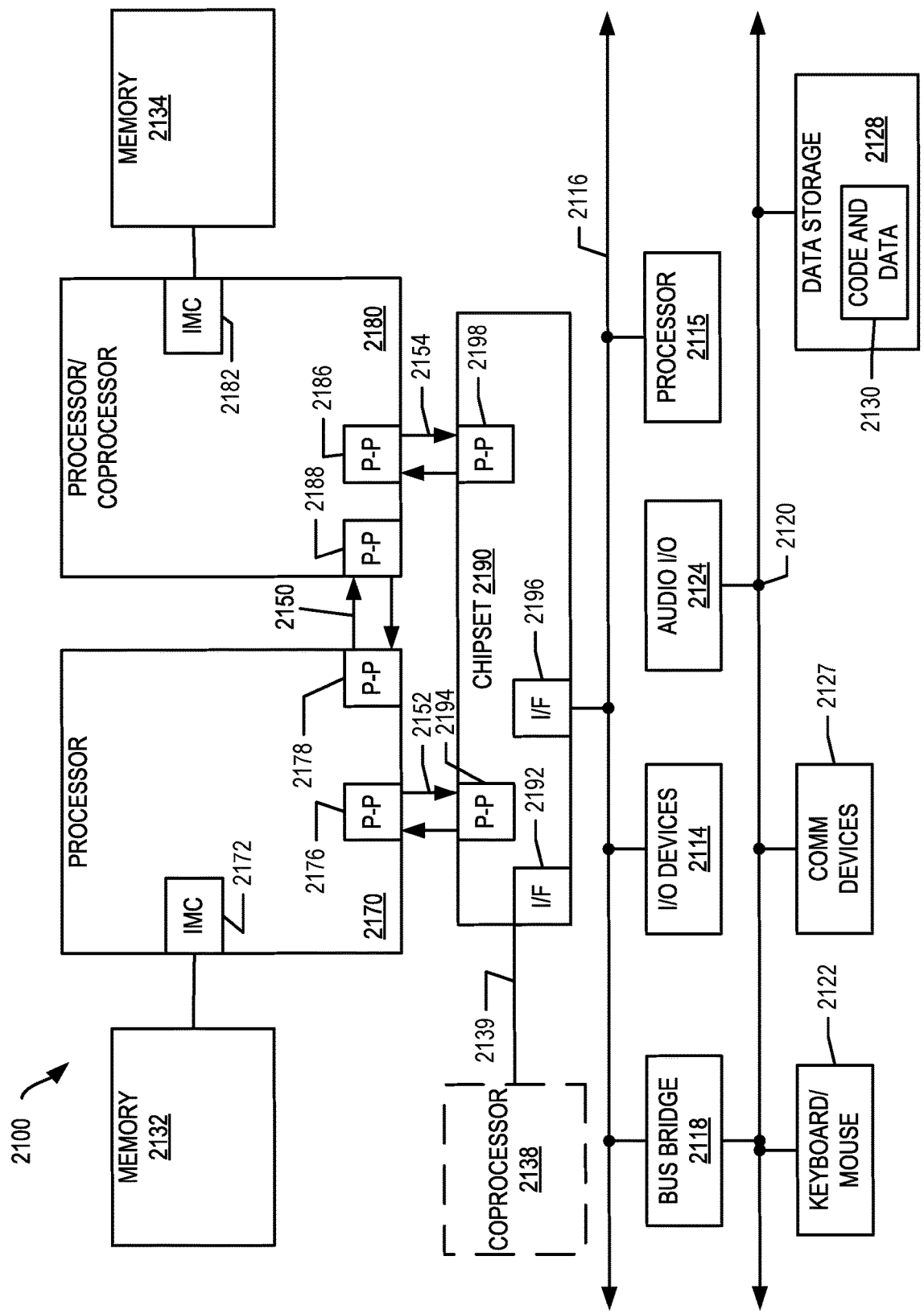
FIG. 21 is a block diagram of a more specific exemplary system in accordance with an embodiment of the present disclosure.

Referring now to FIG. 21, shown is a block diagram of a first more specific exemplary system 2100 in accordance with an embodiment of the present disclosure. As shown in FIG. 21, multiprocessor system 2100 is a point-to-point interconnect system, and includes a first processor 2170 and a second processor 2180 coupled via a point-to-point interconnect 2150. Each of processors 2170 and 2180 may be some version of the processor 1900. In one embodiment of the disclosure, processors 2170 and 2180 are respectively processors 2010 and 2015, while coprocessor 2138 is coprocessor 2045. In another embodiment, processors 2170 and 2180 are respectively processor 2010 coprocessor 2045.

Processors 2170 and 2180 are shown including integrated memory controller (IMC) units 2172 and 2182, respectively. Processor 2170 also includes as part of its bus controller units point-to-point (P-P) interfaces 2176 and 2178; similarly, second processor 2180 includes P-P interfaces 2186 and 2188. Processors 2170, 2180 may exchange information via a point-to-point (P-P) interface 2150 using P-P interface circuits 2178, 2188. As shown in FIG. 21, IMCs 2172 and 2182 couple the processors to respective memories, namely a memory 2132 and a memory 2134, which may be portions of main memory locally attached to the respective processors.

Processors 2170, 2180 may each exchange information with a chipset 2190 via individual P-P interfaces 2152, 2154 using point to point interface circuits 2176, 2194, 2186, 2198. Chipset 2190 may optionally exchange information with the coprocessor 2138 via a high-performance interface 2139. In one embodiment, the coprocessor 2138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 2190 may be coupled to a first bus 2116 via an interface 2196. In one embodiment, first bus 2116 may be a Peripheral Component Interconnect (PCI) bus, or a bus such as a PCI Express bus or another third generation I/O interconnect bus, although the scope of the present disclosure is not so limited.

As shown in FIG. 21, various I/O devices 2114 may be coupled to first bus 2116, along with a bus bridge 2118 which couples first bus 2116 to a second bus 2120. In one embodiment, one or more additional processor(s) 2115, such as coprocessors, high-throughput MIC processors, GPGPU's, accelerators (such as, e.g., graphics accelerators or digital signal processing (DSP) units), field programmable gate arrays, or any other processor, are coupled to first bus 2116. In one embodiment, second bus 2120 may be a low pin count (LPC) bus. Various devices may be coupled to a second bus 2120 including, for example, a keyboard and/or mouse 2122, communication devices 2127 and a storage unit 2128 such as a disk drive or other mass storage device which may include instructions/code and data 2130, in one embodiment. Further, an audio I/O 2124 may be coupled to the second bus 2120. Note that other architectures are possible. For example, instead of the point-to-point architecture of FIG. 21, a system may implement a multi-drop bus or other such architecture.

Figure 22:
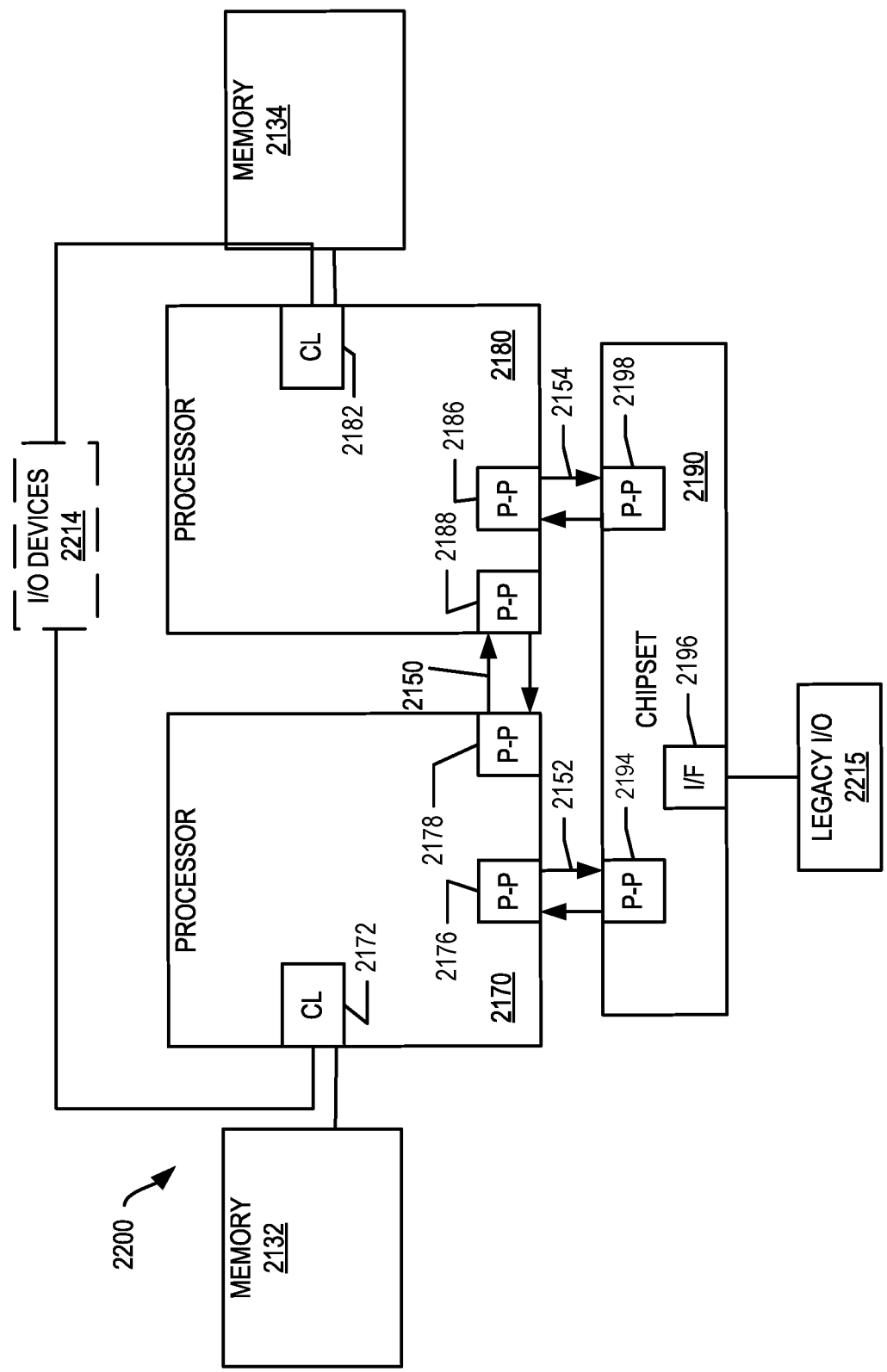
FIG. 22, shown is a block diagram of a second more specific exemplary system in accordance with an embodiment of the present disclosure.

Referring now to FIG. 22, shown is a block diagram of a second more specific exemplary system 2200 in accordance with an embodiment of the present disclosure Like elements in FIGS. 21 and 22 bear like reference numerals, and certain aspects of FIG. 21 have been omitted from FIG. 22 in order to avoid obscuring other aspects of FIG. 22.

FIG. 22 illustrates that the processors 2170, 2180 may include integrated memory and I/O control logic ("CL") 2172 and 2182, respectively. Thus, the CL 2172, 2182 include integrated memory controller units and include I/O control logic. FIG. 22 illustrates that not only are the memories 2132, 2134 coupled to the CL 2172, 2182, but also that I/O devices 2214 are also coupled to the control logic 2172, 2182. Legacy I/O devices 2215 are coupled to the chipset 2190.

Figure 23:
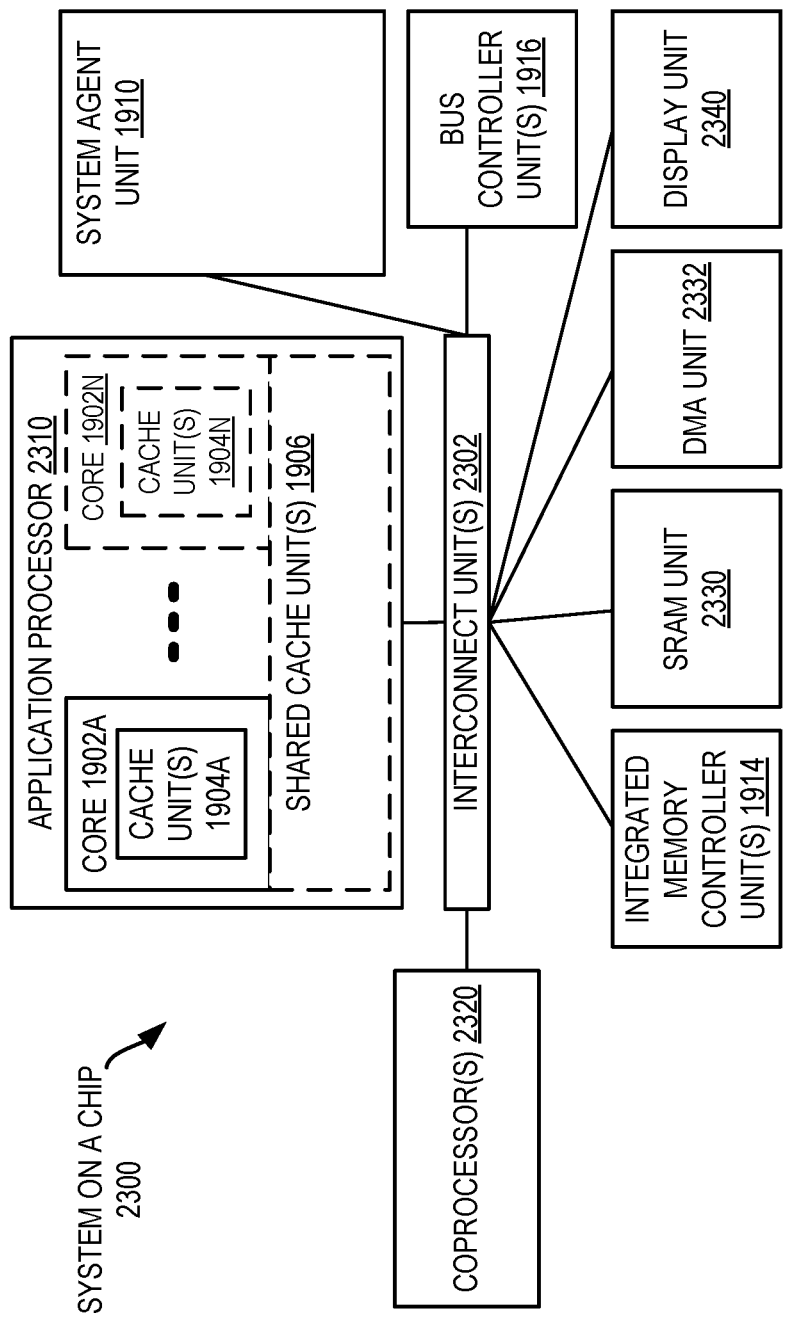
FIG. 23, shown is a block diagram of a system on a chip (SoC) in accordance with an embodiment of the present disclosure.

Referring now to FIG. 23, shown is a block diagram of a SoC 2300 in accordance with an embodiment of the present disclosure. Similar elements in FIG. 19 bear like reference numerals. Also, dashed lined boxes are optional features on more advanced SoCs. In FIG. 23, an interconnect unit(s) 2302 is coupled to: an application processor 2310 which includes a set of one or more cores 202A-N and shared cache unit(s) 1906; a system agent unit 1910; a bus controller unit(s) 1916; an integrated memory controller unit(s) 1914; a set or one or more coprocessors 2320 which may include integrated graphics logic, an image processor, an audio processor, and a video processor; an static random access memory (SRAM) unit 2330; a direct memory access (DMA) unit 2332; and a display unit 2340 for coupling to one or more external displays. In one embodiment, the coprocessor(s) 2320 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 2130 illustrated in FIG. 21, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 24:
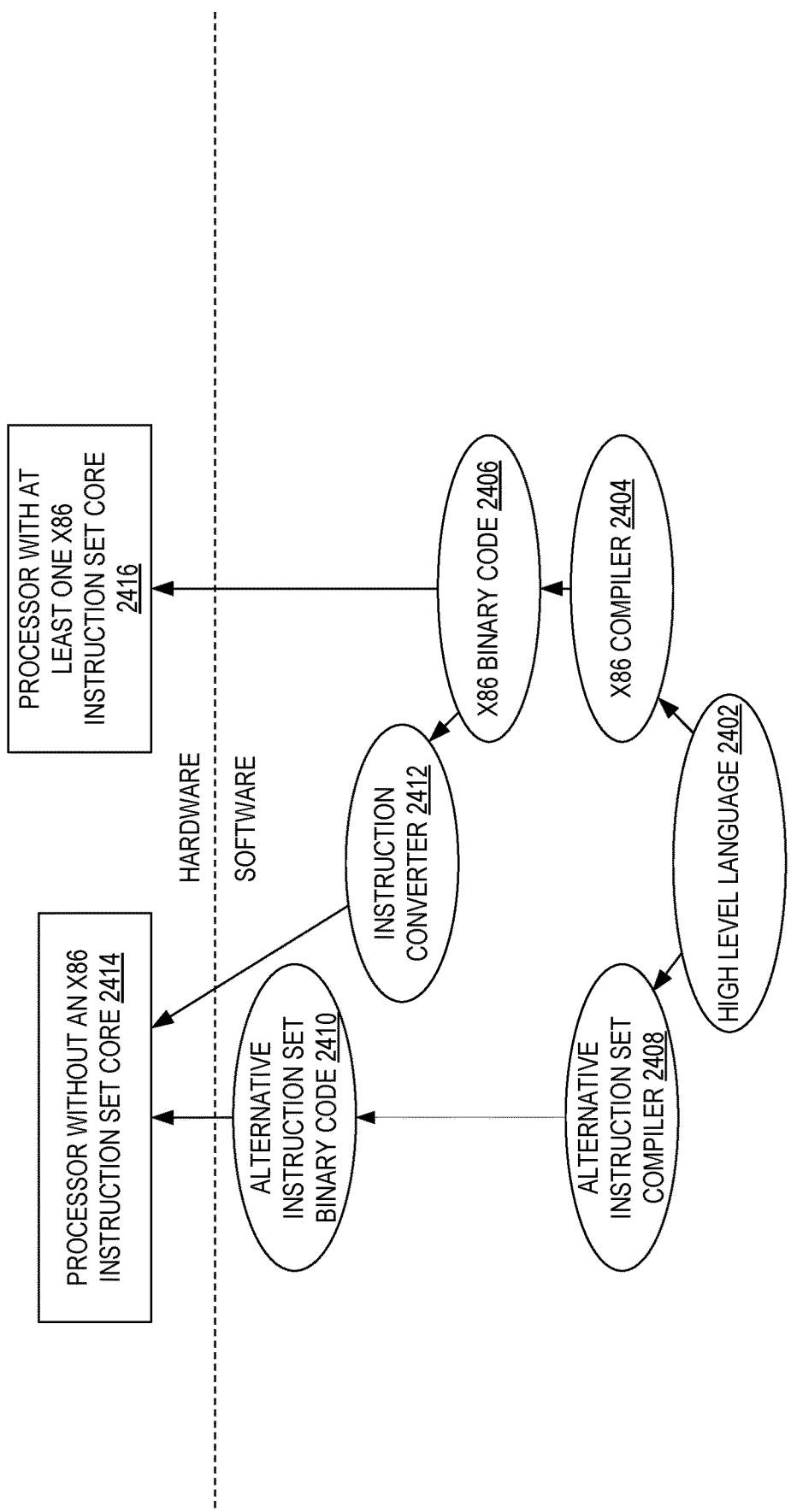
FIG. 24 is a block diagram contrasting the use of a software instruction converter to convert binary instructions in a source instruction set to binary instructions in a target instruction set according to embodiments of the disclosure.

FIG. 24 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 24 shows a program in a high level language 2402 may be compiled using an x86 compiler 2404 to generate x86 binary code 2406 that may be natively executed by a processor with at least one x86 instruction set core 2416. The processor with at least one x86 instruction set core 2416 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 2404 represents a compiler that is operable to generate x86 binary code 2406 (e.g., object code) that can, with or without additional linkage processing, be executed on the processor with at least one x86 instruction set core 2416. Similarly, FIG. 24 shows the program in the high level language 2402 may be compiled using an alternative instruction set compiler 2408 to generate alternative instruction set binary code 2410 that may be natively executed by a processor without at least one x86 instruction set core 2414 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2412 is used to convert the x86 binary code 2406 into code that may be natively executed by the processor without an x86 instruction set core 2414. This converted code is not likely to be the same as the alternative instruction set binary code 2410 because an instruction converter capable of this is difficult to make; however, the converted code will accomplish the general operation and be made up of instructions from the alternative instruction set. Thus, the instruction converter 2412 represents software, firmware, hardware, or a combination thereof that, through emulation, simulation or any other process, allows a processor or other electronic device that does not have an x86 instruction set processor or core to execute the x86 binary code 2406.

What is claimed is:

1. An apparatus comprising:
   a message digest data path circuit comprising:
      a first message digest circuit to output a second state vector, at a first clock rate, based on a first state vector and an output from a first switch, and
      a second message digest circuit to output a third state vector, at the first clock rate, based on the second state vector and an output from a second switch;
   a message scheduler data path circuit comprising:
      at least one first message scheduler circuit to output an element into a second message vector, at a second clock rate that is slower than the first clock rate, based on a plurality of elements of a first message vector, and
      at least one second message scheduler circuit to output an element into a fourth message vector, at the second clock rate that is slower than the first clock rate, based on a plurality of elements of a third message vector; and
   a controller to:
      switch the first switch at the second clock rate between sourcing a first element of the first message vector and a first element of the third message vector as the output from the first switch, and
      switch the second switch at the second clock rate between sourcing a second element of the first message vector and a second element of the third message vector as the output from the second switch.

2. The apparatus of claim 1, wherein the at least one first message scheduler circuit comprises a plurality of first message scheduler circuits, and one of the plurality of first message scheduler circuits outputs the element into the second message vector, at the second clock rate, based on a proper subset of the plurality of elements of the first message vector, and another of the plurality of first message scheduler circuits outputs a second element into the second message vector, at the second clock rate, based on a shifted proper subset of the plurality of elements of the first message vector.

3. The apparatus of claim 2, wherein the one of the plurality of first message scheduler circuits outputs the element into the second message vector and the another of the plurality of first message scheduler circuits outputs the second element into the second message vector in a same clock cycle of the second clock rate.

4. The apparatus of claim 1, further comprising a third switch to time multiplex the at least one first message scheduler circuit to output the element into the second message vector based on the plurality of elements of the first message vector and output an element into the fourth message vector based on the plurality of elements of the third message vector.

5. The apparatus of claim 4, wherein the third switch is to time multiplex the at least one first message scheduler circuit to output the element into the second message vector based on the plurality of elements of the first message vector and output the element into the fourth message vector based on the plurality of elements of the third message vector in a same clock cycle of the second clock rate.

6. The apparatus of claim 1, wherein the controller is to alternate loading a new value for the first message vector into a first register of the at least one first message scheduler circuit and a new value for the third message vector into a second register of the at least one second message scheduler circuit in consecutive cycles of the first clock rate.

7. The apparatus of claim 1, wherein the controller is to shift a proper subset of the plurality of elements of the first message vector into the second message vector and insert the element that is output from the at least one first message scheduler circuit into the second message vector, and shift a proper subset of the plurality of elements of the third message vector into the fourth message vector and insert the element that is output from the at least one second message scheduler circuit into the fourth message vector.

8. The apparatus of claim 7, wherein each shift magnitude is a plurality of element positions.

9. A method comprising:
   outputting a second state vector, at a first clock rate, based on a first state vector and an output from a first switch with a first message digest circuit of a message digest data path circuit, and a third state vector, at the first clock rate, based on the second state vector and an output from a second switch with a second message digest circuit of the message digest data path circuit;
   outputting an element into a second message vector, at a second clock rate that is slower than the first clock rate, based on a plurality of elements of a first message vector with at least one first message scheduler circuit of a message scheduler data path circuit, and an element into a fourth message vector, at the second clock rate that is slower than the first clock rate, based on a plurality of elements of a third message vector with at least one second message scheduler circuit of a message scheduler data path circuit;
   switching the first switch at the second clock rate between sourcing a first element of the first message vector and a first element of the third message vector as the output from the first switch; and
   switching the second switch at the second clock rate between sourcing a second element of the first message vector and a second element of the third message vector as the output from the second switch.

10. The method of claim 9, wherein the at least one first message scheduler circuit comprises a plurality of first message scheduler circuits, further comprising:
    one of the plurality of first message scheduler circuits outputting the element into the second message vector, at the second clock rate, based on a proper subset of the plurality of elements of the first message vector; and
    another of the plurality of first message scheduler circuits outputting a second element into the second message vector, at the second clock rate, based on a shifted proper subset of the plurality of elements of the first message vector.

11. The method of claim 10, wherein the one of the plurality of first message scheduler circuits outputs the element into the second message vector and the another of the plurality of first message scheduler circuits outputs the second element into the second message vector in a same clock cycle of the second clock rate.

12. The method of claim 9, further comprising time multiplexing, with a third switch, the at least one first message scheduler circuit to output the element into the second message vector based on the plurality of elements of the first message vector and output an element into the fourth message vector based on the plurality of elements of the third message vector.

13. The method of claim 12, wherein the third switch time multiplexes the at least one first message scheduler circuit to output the element into the second message vector based on the plurality of elements of the first message vector and output the element into the fourth message vector based on the plurality of elements of the third message vector in a same clock cycle of the second clock rate.

14. The method of claim 9, further comprising alternately loading a new value for the first message vector into a first register of the at least one first message scheduler circuit and a new value for the third message vector into a second register of the at least one second message scheduler circuit in consecutive cycles of the first clock rate.

15. The method of claim 9, further comprising:
    shifting a proper subset of the plurality of elements of the first message vector into the second message vector and inserting the element that is output from the at least one first message scheduler circuit into the second message vector; and
    shifting a proper subset of the plurality of elements of the third message vector into the fourth message vector and inserting the element that is output from the at least one second message scheduler circuit into the fourth message vector.

16. The method of claim 15, wherein each shifting magnitude is a plurality of element positions.

17. A non-transitory machine readable medium that stores code that when executed by a machine causes the machine to perform a method comprising:
    outputting a second state vector, at a first clock rate, based on a first state vector and an output from a first switch with a first message digest circuit of a message digest data path circuit, and a third state vector, at the first clock rate, based on the second state vector and an output from a second switch with a second message digest circuit of the message digest data path circuit;
    outputting an element into a second message vector, at a second clock rate that is slower than the first clock rate, based on a plurality of elements of a first message vector with at least one first message scheduler circuit of a message scheduler data path circuit, and an element into a fourth message vector, at the second clock rate that is slower than the first clock rate, based on a plurality of elements of a third message vector with at least one second message scheduler circuit of a message scheduler data path circuit;
    switching the first switch at the second clock rate between sourcing a first element of the first message vector and a first element of the third message vector as the output from the first switch; and
    switching the second switch at the second clock rate between sourcing a second element of the first message vector and a second element of the third message vector as the output from the second switch.

18. The non-transitory machine readable medium of claim 17, wherein the at least one first message scheduler circuit comprises a plurality of first message scheduler circuits, further comprising:
    one of the plurality of first message scheduler circuits outputting the element into the second message vector, at the second clock rate, based on a proper subset of the plurality of elements of the first message vector; and
    another of the plurality of first message scheduler circuits outputting a second element into the second message vector, at the second clock rate, based on a shifted proper subset of the plurality of elements of the first message vector.

19. The non-transitory machine readable medium of claim 18, wherein the one of the plurality of first message scheduler circuits outputs the element into the second message vector and the another of the plurality of first message scheduler circuits outputs the second element into the second message vector in a same clock cycle of the second clock rate.

20. The non-transitory machine readable medium of claim 17, further comprising time multiplexing, with a third switch, the at least one first message scheduler circuit to output the element into the second message vector based on the plurality of elements of the first message vector and output an element into the fourth message vector based on the plurality of elements of the third message vector.

21. The non-transitory machine readable medium of claim 20, wherein the third switch time multiplexes the at least one first message scheduler circuit to output the element into the second message vector based on the plurality of elements of the first message vector and output the element into the fourth message vector based on the plurality of elements of the third message vector in a same clock cycle of the second clock rate.

22. The non-transitory machine readable medium of claim 17, further comprising alternately loading a new value for the first message vector into a first register of the at least one first message scheduler circuit and a new value for the third message vector into a second register of the at least one second message scheduler circuit in consecutive cycles of the first clock rate.

23. The non-transitory machine readable medium of claim 17, further comprising:
    shifting a proper subset of the plurality of elements of the first message vector into the second message vector and inserting the element that is output from the at least one first message scheduler circuit into the second message vector; and
    shifting a proper subset of the plurality of elements of the third message vector into the fourth message vector and inserting the element that is output from the at least one second message scheduler circuit into the fourth message vector.

24. The non-transitory machine readable medium of claim 23, wherein each shifting magnitude is a plurality of element positions.

* * * * *